(12) United States Patent
Chen et al.

(10) Patent No.: US 11,556,032 B2
(45) Date of Patent: Jan. 17, 2023

(54) DIFFUSION PLATE AND BACKLIGHT MODULE HAVING THE DIFFUSION PLATE

(71) Applicant: Entire Technology Co., Ltd., Taoyuan (TW)

(72) Inventors: Yan-Zuo Chen, Taoyuan (TW); Hung Han Kao, Taoyuan (TW); Tsung-Chang Yang, Taoyuan (TW)

(73) Assignee: Entire Technology Co. Ltd.

( * ) Notice: Subject to any disclaimer, the term of this patent is extended or adjusted under 35 U.S.C. 154(b) by 0 days.

(21) Appl. No.: 17/511,175

(22) Filed: Oct. 26, 2021

(65) Prior Publication Data

US 2022/0179264 A1    Jun. 9, 2022

(30) Foreign Application Priority Data

Dec. 4, 2020   (TW) .................................. 109142928

(51) Int. Cl.
*G02F 1/00* (2006.01)
*G02F 1/1335* (2006.01)
*G02F 1/13357* (2006.01)

(52) U.S. Cl.
CPC .................. *G02F 1/133607* (2021.01); *G02F 1/133603* (2013.01)

(58) Field of Classification Search
CPC ................. G02B 6/0053; G02B 5/0231; G02B 5/0278; G02F 1/133607; G02F 1/133603
See application file for complete search history.

(56) References Cited

U.S. PATENT DOCUMENTS

| | | | |
|---|---|---|---|
| 9,341,754 B2* | 5/2016 | Maekawa | G02B 5/0231 |
| 2009/0097245 A1* | 4/2009 | Hsu | G02B 3/0056 |
| | | | 359/837 |
| 2009/0290218 A1* | 11/2009 | Parker | G02F 1/133615 |
| | | | 359/580 |

* cited by examiner

*Primary Examiner* — Gerald J Sufleta, II

(57) ABSTRACT

The invention refers to a diffusion plate and a backlight module having the diffusion plate. The diffusion plate comprises a plate-body and a plurality of pyramid-like structures arranged on a surface of the plate-body. Each pyramid-like structure has a bottom surface, a first convex portion and a second convex portion. The first convex portion and the second convex portion have different vertex angles, and therefore the pyramid-like structure can also be called as "pyramid-like structure with multiple vertex angles". The pyramid-like structures with multiple vertex angles can increase the light splitting points, which can improve the light splitting effect of the diffusion plate. The light source of a single light-emitting diode can be divided into eight point-light sources (light splitting points) or more, which is double the number of light splitting points compared with the traditional pyramid structure with single vertex, and thus can greatly improve the light diffusion effect.

17 Claims, 21 Drawing Sheets

| | pyramid | | | | | |
|---|---|---|---|---|---|---|
| vertex angle θ (°) | none | 50° | 70° | 90° | 110° | 130° |
| material refractive index nd | 1.59 | | | | | |
| OD(mm) | 2 | | | | | |
| structure type | none | convex | convex | convex | convex | convex |
| structure placement angle (°) | 45 | | | | | |
| light Splitting effect | | | | | | |
| light Splitting distance d(mm) | - | 8.2 | 5.7 | 3.6 | 1.9 | 1.2 |

FIG.4

| embodyment | pyramid(comparison) | two vertex angles | two vertex angles | two vertex angles |
|---|---|---|---|---|
| rertex angle | 90 | 60,90 | 90,60 | 90,60,30 |
| structure |  |  |  |  |
| material refracture index nd | 1.59 | | | |
| OD(mm) | 2 | | | |
| structure type | convex | convex | convex | convex |
| structure placement angle (°) | | 45 | | |
| light Splitting effect |  | | |  |
| light Splitting amount | 4 | 8 | 8 | 12 |
| light Splitting distance d(mm) | 3.6 | 6.5,3.6 | 3.6,6.5 | 3.6,6.5,11.2 |

| embodyment | (P=5mm)<d'<d" | d'<d"<(P=5mm) | d'<(P=5mm)<d" |
|---|---|---|---|
| rertex angle | 70,60 | 90,80 | 90,60 |
| structure | | | |
| material refractire index nd | | 1.59 | |
| OD(mm) | | 2 | |
| structure type | convex | convex | convex |
| structure placement angle (°) | | 45 | |
| light Splitting distance d',d"(mm) | 5.9,6.5 | 3.6,4.5 | 3.6,6.5 |
| light Splitting effect | light spots slightly visible | light spots clearly visible | light spots not visible |

FIG.11

| embodyment | (P=10mm)<d'<d" | d'<d"<(P=10mm) | d'<(P=10mm)<d" |
|---|---|---|---|
| vertex angle | 45,50 | 70,80 | 50,70 |
| structure | | | |
| material refractire index nd | 1.59 | | |
| OD(mm) | 3 | | |
| structure type | convex | convex | convex |
| structure placement angle (°) | 45 | | |
| light Splitting distance d',d"(mm) | 12.4,13.8 | 8.2,6.6 | 13.8,8.2 |
| light Splitting effect | light spots slightly visible | light spots clearly visible | light spots not visible |

FIG.16

DIFFUSION PLATE AND BACKLIGHT MODULE HAVING THE DIFFUSION PLATE

BACKGROUND OF INVENTION

1. Field of the Invention

The present invention refers to a diffusion plate, especially an optical diffusion plate provided with a plurality of pyramid-like structures with multiple vertex angles, and a direct-lit backlight module including the diffuser plate and using mini light-emitting diodes (Mini LEDs) as light-emitting elements.

2. Description of the Prior Art

Mini LED is the abbreviation of "mini light emitting diode", which generally means an LED with a grain size of about 100-200 microns (μm). Because the grain size of Micro LED (micro light emitting diode) is below 50 μm, there are still technical obstacles such as high manufacturing cost and difficult massive transfer. Therefore, the development of Mini LED with relatively mature manufacturing technology is popular in the art.

The grain size and required technology of Mini LED are between traditional LEDs and Micro LEDs. Compared with Micro LEDs, Mini LED has a higher production yield rate in the manufacturing process. It has special-shaped profiling cutting characteristics. It can also be used with a flexible substrate to achieve a high-curved backlight module. Mini LED backlight module can adopt local dimming design, has better color rendering effect, and can bring liquid crystal display panel (LCD Panel) finer high-dynamic range (HDR) partition, and the thickness is also close to the organic light-emitting diode (OLED). It can save power up to 80%, so it is demanded for backlight applications such as power saving, thinning, HDR, and special-shaped displays. In the LCD displays using the backlight module as the light source, because Mini LEDs have the advantages of high brightness, high contrast and high display effect, in addition, the cost of Mini LED backlight module using the blue Mini LED chips as the basic light source is lower than the cost of Mini LED backlight module using three primary colors of RGB as the light source; therefore, the backlight module composed of blue Mini LEDs is cheaper in cost, and is more suitable for the backlight module of mobile phones, tablet computers, desktop displays, TVs, car display panels and gaming laptops.

Therefore, using Mini LEDs (point-light sources) as direct-lit backlight modules for LCD panels is the main trend in the next few years. Compared with traditional LEDs, Mini LEDs are miniaturized 80~300 μm in grain size, and are emitting blue light in order to comply with the design of wide color gamut panel, and then the blue light is converted into white light by using a color conversion layer. This direct-lit typed backlight module requires a diffusion plate/film above the Mini LEDs. The Mini LEDs (point-light sources) are diffused by light refraction, reflection and scattering, thereby achieving the function of making the backlight module to emit more uniform light. Spectral diffusion is mainly caused by the surface structure, and the body diffusion is caused by the diffusion particles in the plate/membrane or the matte or smooth surface of the plate surface.

The LED pitch (P) and the distance (OD) from the LED to the lower surface of the diffuser plate of the existing Mini LED backlight module are both shorter than that of the traditional LED backlight module, and the total thickness of the Mini LED backlight module design is also much smaller than that of the traditional LED backlight module. The comparison between these two is shown in Table 1.

TABLE 1

Comparison of existing Mini LED backlight modules and traditional LED backlight modules

|  | traditional LED backlight module | Mini LED backlight module |
|---|---|---|
| LED pitch ( P; mm) | 50~150 (w/o lens) >150 (w lens) | 4~10 (w/o lens) |
| OD (mm) | 15~30 | 0~5 |
| total thickness (mm) | 20~35 | <6 |

In addition, the arrangement density of the existing Mini LED backlight module is higher than that of the traditional LED backlight module; mini LED can get more accurate backlight control of bright and dark areas, that is, better panel image contrast. Comparing the diffusion plate used in Mini LED with the traditional LED diffusion plate, the difference in the design of the diffuser plate caused by the above-mentioned differences is shown in Table 2 below.

TABLE 2

Comparison between existing Mini LED diffuser and traditional LED diffuser

|  | traditional LED diffuser | Mini LED diffuser |
|---|---|---|
| thickness (mm) | >1 | <0.5 |
| Surface structure | Texture | Pyramid or other microstructure |
| Diffusion method | Volume diffusion mainly | Spectroscopic diffusion mainly |

In order to provide the function of refraction, reflection or scattering of light, the existing Mini LED diffuser is often provided with many microstructures composed of convex parts or concave parts on its surface; for example, hemispherical or single-vertex pyramid-shaped microstructures. However, for those conventional diffuser provided with hemispherical or single-vertex pyramid-shaped microstructures, the lamp beads of the light splitting points generated by the light splitting effects of the diffuser are still clearly visible. The diffusive effect is not good, but there is room for further improvements.

Therefore, the present invention provides a diffusion plate and a backlight module having the diffusion plate, which can solve the various deficiencies of the aforementioned conventional diffusion plates provided with hemispherical or single-vertex pyramid-shaped microstructures.

SUMMARY OF THE INVENTION

The invention refers to a diffusion plate which comprises a plate-body and a plurality of pyramid-like structures arranged on a surface of the plate-body. Each pyramid-like structure has a bottom surface, a first convex portion and a second convex portion. The first convex portion and the second convex portion have different vertex angles, and therefore the pyramid-like structure can also be called as "pyramid-like structure with multiple vertex angles". The pyramid-like structures with multiple vertex angles can increase the light splitting points, which can improve the light splitting effect of the diffusion plate. The light source of a single light-emitting diode can be divided into 8 point-light sources (light splitting points) or more, which is double the number of light splitting points compared with the traditional pyramid structure with single vertex, and thus can greatly improve the light diffusion effect.

Another objective of the invention is to provide a backlight module having the aforementioned diffusion plate.

In a preferred embodiment, the backlight module comprises a substrate and a plurality of light-emitting elements arranged in an array on the substrate; the diffusion plate is located above the substrate and comprises:

- a plate body; said plate body having an upper surface and a lower surface;
- a plurality of pyramid-like structures, arranged in an array on an upper surface of the plate body;

wherein, each said pyramid-like structure comprises:

- a bottom surface, the bottom surface is rectangular and has four vertices and four bottom edges;
- a first convex portion, said first convex portion protrudes upward from the bottom surface by a first height; the first convex portion includes four first side-edges extending obliquely upward from the four vertices of the bottom surface, respectively; the four first side-edges of the first convex portion are not only equal in length but also extend upward at a same first inclination angle; wherein an angle between two opposite said first side-edges is a first vertex angle;
- a second convex portion, protrudes upward from a top of the first convex portion to a second height; the second convex portion includes four second side-edges extending obliquely upward from top-ends of the four first side-edges of the first convex portion; the four second side-edges of the second convex portion are not only equal in length but also extend upward at a same second inclination angle; wherein an angle between two opposite said second side-edges is a second vertex angle;

wherein, the first vertex angle is not equal to the second vertex angle, and therefore, the pyramid-like structure has multiple vertex angles.

In a preferred embodiment, the first inclination angle refers to the included angle between the first side-edge and the bottom surface; the second inclination angle refers to the included angle between the second side-edge and the bottom surface; both the first inclination angle and the second inclination angle are less than 90°.

In a preferred embodiment, the light-emitting elements are arranged on the substrate in a rectangular array along an X-axis direction and a Y-axis direction perpendicular to each other; the light-emitting elements at least comprises a first light-emitting element, a second light-emitting element, a third light-emitting element, and a fourth light-emitting element adjacently arranged at four apex positions of a rectangular block; a line segment defined by the first light-emitting element and the second light-emitting element as its two end points is parallel to the X-axis direction, in addition, another line segment defined by the first light-emitting element and the fourth light-emitting element as its two end points is parallel to the Y-axis; the included angle between the line segment formed by the first light-emitting element and the third light-emitting element and the X-axis direction is approximately 45° and is the diagonal line of the rectangular block; the first light-emitting element is substantially located below a center point of the bottom surface of one of the pyramid-like structures, and emits light substantially upward toward a Z-axis direction; the Z-axis direction, the X-axis direction and the Y-axis direction are all perpendicular to each other;

the first convex portion of the pyramid-like structure has four first side-faces formed by said four first side-edges; each said first side-face is able to refract the light emitted by the first light-emitting element and thereby generate a first light-splitting point corresponding to the light-emitting element;

the second convex portion of the pyramid-like structure has four second side-faces formed by said four second side-edges; each said second side-face is able to refract the light emitted by the first light-emitting element and thereby generate a second light-splitting point corresponding to the light-emitting element;

the distance between the first light-emitting element and the third light-emitting element is P; the distance between the first light-emitting element and the bottom surface of the pyramid-like structure is OD; the distance between the first light-emitting element and the first light splitting point is d'/2; the distance between the first light-emitting element and the second light splitting point is d"/2; the first vertex angle is θ'; the second apex angle is θ"; a refractive index of material of the diffusion plate is n, and a light critical angle is α; a shape of the pyramid-like structure meets the following mathematical conditions:

$$\alpha = \sin^{-1}(1/n);$$

$$d' < P < d'';$$

$$d' = 2*OD*(\tan(90-\alpha-\theta'/2)+\tan(\theta'/2-2\alpha));$$

$$d'' = 2*OD*(\tan(90-\alpha-\theta''/2)+\tan(\theta''/2-2\alpha)).$$

In a preferred embodiment, n=1.59; 5 mm≤P≤10 mm; 0 mm<OD≤5 mm; a length W of the bottom edge of the bottom surface of the pyramid-like structure is 0.05 mm≤W≤1 mm; a height H' of the first convex portion in the Z-axis direction is 0.1 mm≤H'≤2 mm; a height H" of the second convex portion in the Z-axis direction is 0.05 mm≤H"≤1 mm.

In a preferred embodiment, the angle of one of the first vertex angle θ' and the second vertex angle θ" is between 40° and 60°, and the other one is between 60° and 90°.

In a preferred embodiment, the angle of the first vertex angle is smaller than the angle of the second vertex angle, that is, θ'<θ"; P=10 mm; OD=3 mm.

In a preferred embodiment, the light-emitting elements are Mini LEDs; a material of the diffusion plate includes at least one of the following: polycarbonate (PC), polystyrene (PS), polymethyl methacrylate (PMMA, commonly known as acrylic), polypropylene (PP), or the Copolymer of any aforementioned material.

In a preferred embodiment, the diffusion plate is a multi-layer structure composed of at least two layers of different materials by coextrusion process; a plurality of diffusion particles are contained in the diffusion plate; a material of the diffusion particles includes one of the following: silicon dioxide ($SiO_2$), titanium dioxide ($TiO_2$), polymethylmethacrylate (PMMA), polystyrene (PS), polycarbonate (PC), polypropylene (PP), or copolymer of the aforementioned materials; a particle diameter of the diffusion particles ranges from 0.5 to 10 μm, and a weight percentage of concentration of the diffusion particles ranges from 1 to 10% wt.

In a preferred embodiment, the diffusion plate has a three-layer structure which includes: an engineering plastic layer containing polycarbonate (PC), an upper acrylic (Polymethyl Methacrylate; PMMA) layer located above the engineering plastic layer, and a lower acrylic layer located below the engineering plastic layer; a refractive index difference range between these three layers of the diffusion plate is between 0.01 and 0.1; wherein, a thickness of the engineering plastic layer accounts for 60%-99.99% of total thickness of the diffusion plate, and thicknesses of the upper and lower acrylic layers on the upper and lower sides of the engineering plastic layer account for 0.01%~40% of the total thickness of the diffusion plate.

In a preferred embodiment, the lower surface of the plate body of the diffusion plate is a light-input surface; the lower acrylic layer includes at least one high reflectance material; the high reflectance material has a reflection wavelength range of 400-510 nm, an average reflectance higher than 70%, and contains at least one of the following inorganic substances: silicon dioxide ($SiO_2$), titanium dioxide ($TiO_2$), calcium carbonate, magnesium carbonate, calcium sulfate, and magnesium sulfate.

In a preferred embodiment, the backlight module further comprises:
  a dichroic filter film, located above the diffusion plate, which can transmit or reflect the light emitted by the light-emitting element according to different wavelengths, similar to a filtering function, reflecting red and green light, and providing blue light;
  a color conversion layer, located above the dichroic filter film, the color conversion layer being an optical film containing Quantum Dots (QD) material or fluorescent materials that can convert part of blue wavelength light energy into red and green wavelengths in order to output white light as required;
  at least one prism sheet, located above the color conversion layer, which can concentrate scattered light to improve the brightness of the central viewing angle; and
  a dual brightness enhancement film (DBEF), located above the at least one prism sheet, which can further increase the brightness of the light as well as the range of viewing angles;
  wherein, a reflective layer is provided on a top surface of the substrate.

BRIEF DESCRIPTION OF THE DRAWINGS

The present invention will now be specified with reference to its preferred embodiment illustrated in the drawings, in which:

FIG. 4 is a comparison diagram of different light splitting effects and different light splitting distances that can be achieved by a conventional diffusion plate with a single-vertex pyramid structure at different vertex angles $\theta$;

FIG. 11 is a comparison diagram between various optical simulation results of the diffusion plate with multiple-vertex pyramid-like structures of the present invention with different light splitting distances and pitches (d', d'', P) according to different vertex angles ($\theta'$, $\theta''$) that can achieve different light splitting effects;

FIG. 16 is a comparison diagram of optical simulations results of the diffusion plate with multiple-vertex pyramid-like structures of the present invention by using different combinations of vertex angles $\theta'$ and $\theta''$ (where OD=3 mm).

DESCRIPTION OF THE PREFERRED EMBODIMENT

The invention refers to a diffusion plate and a backlight module having the diffusion plate. The diffusion plate comprises a plate-body and a plurality of pyramid-like structures arranged on a surface of the plate-body. Each pyramid-like structure has a bottom surface, a first convex portion and a second convex portion. The first convex portion and the second convex portion have different vertex angles, and therefore the pyramid-like structure can also be called as "pyramid-like structure with multiple vertex angles". The pyramid-like structures with multiple vertex angles can increase the light splitting points, which can improve the light splitting effect of the diffusion plate. The light source of a single light-emitting diode can be divided into eight point-light sources (light splitting points) or more, which is double the number of light splitting points compared with the traditional pyramid structure with single vertex, and thus can greatly improve the light diffusion effect In order to more clearly describe the diffusion plate and the backlight module having the diffusing plate of the present invention, the following will describe them in detail in conjunction with the drawings.

Figure 1:
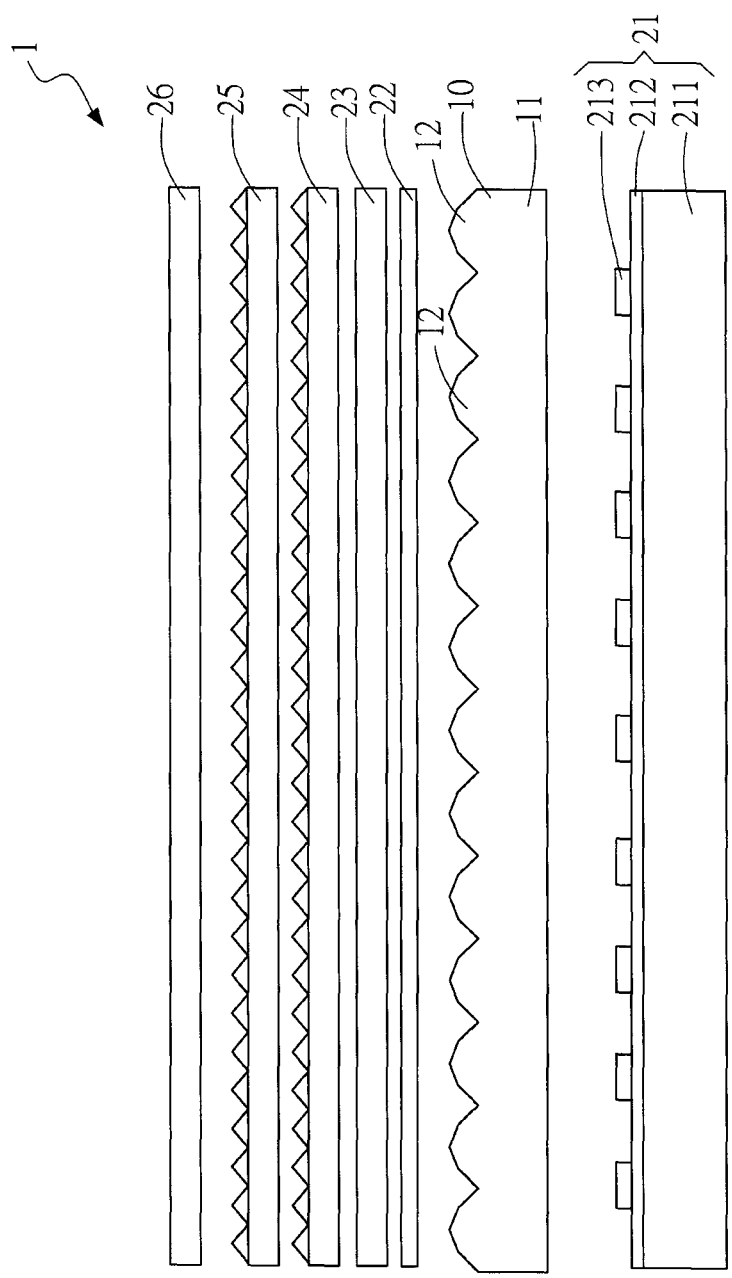
FIG. 1 is a schematic cross-sectional drawing of an embodiment of a backlight module having a diffusion plate of the present invention.

Please refer to FIG. 1, which is a schematic cross-sectional drawing of an embodiment of a backlight module having a diffusion plate of the present invention. In a preferred embodiment, the backlight module 1 of the present invention comprises, from bottom to top, a substrate 21, a plurality of light-emitting elements 213, a diffusion plate 10, a dichroic filter film 22, a color conversion layer 23, at least one prism sheet (including a first prism sheet 24 and a second prism sheet 25), and a dual brightness enhancement film (DBEF) 26.

A circuit layout is provided on the base-plate 211 of the substrate 21. A plurality of light-emitting elements 213 are arranged in an array on the substrate 21 and electrically coupled to the circuit layout. In the present invention, the light-emitting elements 213 can be blue or white light-emitting sub-millimeter light-emitting diodes (i.e., Mini Light-Emitting Diodes, Mini LED for short). In this embodiment, the light-emitting elements 213 are blue Mini LEDs, but they may also be white Mini LEDs, or even traditional LEDs or Micro LEDs. A reflective layer 212 is provided on a top surface of the substrate 21. The reflective layer 212 can be white or other colors or surfaces with a better light reflection effect, and is used to reflect light upward toward the diffusion plate 10. The material of the diffusion plate 10 includes at least one of the following: polycarbonate (PC), polystyrene (PS), polymethyl methacrylate (PMMA, commonly known as acrylic), polypropylene (PP), or the Copolymer of any aforementioned material; the thickness of the diffusion plate 10 is preferably between 0.2 mm-0.3 mm. The diffusion plate 10 is located above the substrate and adjacent to the substrate 21, and generally speaking, there are no other components between the diffusion plate 10 and the light-emitting elements 213 provided on the substrate 21. In the present invention, the diffusion plate 10 comprises: a plate body 11 and a plurality of pyramid-like structures 12. The plate body 11 has an upper surface and a lower surface. The plurality of pyramid-like structures 12 are arranged in an array on either one of the upper or lower surfaces of the plate body 11 and may be convex or concave structures; more preferably, the plurality of pyramid-like structures 12 are arranged on the upper surface of the plate body 11 and are convex structures. The pyramid-like structures 12 described here are the primary technical feature of the present invention, which can greatly enhance the effect of light splitting and diffusion. The details of these pyramid-like structures will be detailed later.

Figure 2A:
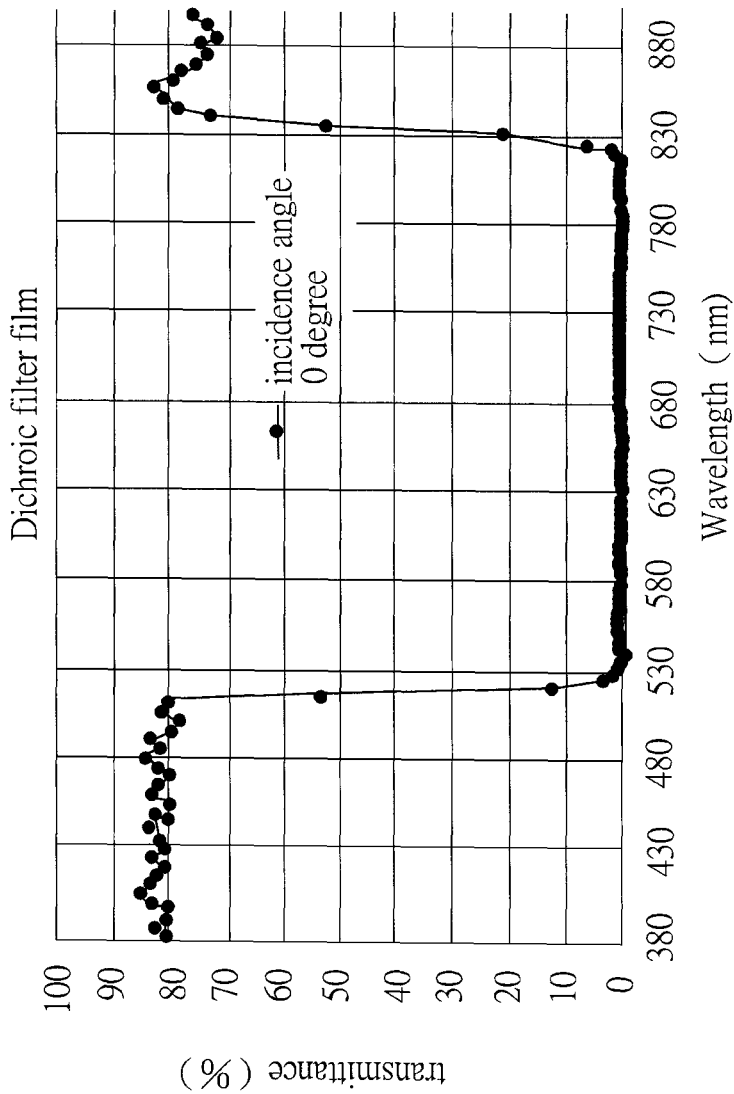
FIG. 2A is a transmittance spectrum diagram of an embodiment of the dichroic filter film in the backlight module of the present invention.

Please refer to FIG. 2A, which is a transmittance spectrum diagram of an embodiment of the dichroic filter film in the backlight module of the present invention. In the present invention, the dichroic filter film 22 is located on the diffusion plate 10. The dichroic filter film 22 is an optical thin-film filter that can divide the light beam into two parts as required. As shown in FIG. 2A, the dichroic filter film has a high transmittance (above 80%) for blue light (wavelength about 450 nm), but it has a low transmittance (close to 0%) for green light (wavelength about 540 nm) and red light (wavelength about 630 nm), that is, a higher reflectivity for green light and red light. Thereby, the dichroic filter film 22 of the present invention can transmit or reflect the transmitted light emitted by the light-emitting element according to different wavelengths, similar to a filtering function, reflecting red and green light, and providing blue light with the best conversion efficiency.

Figure 2B:
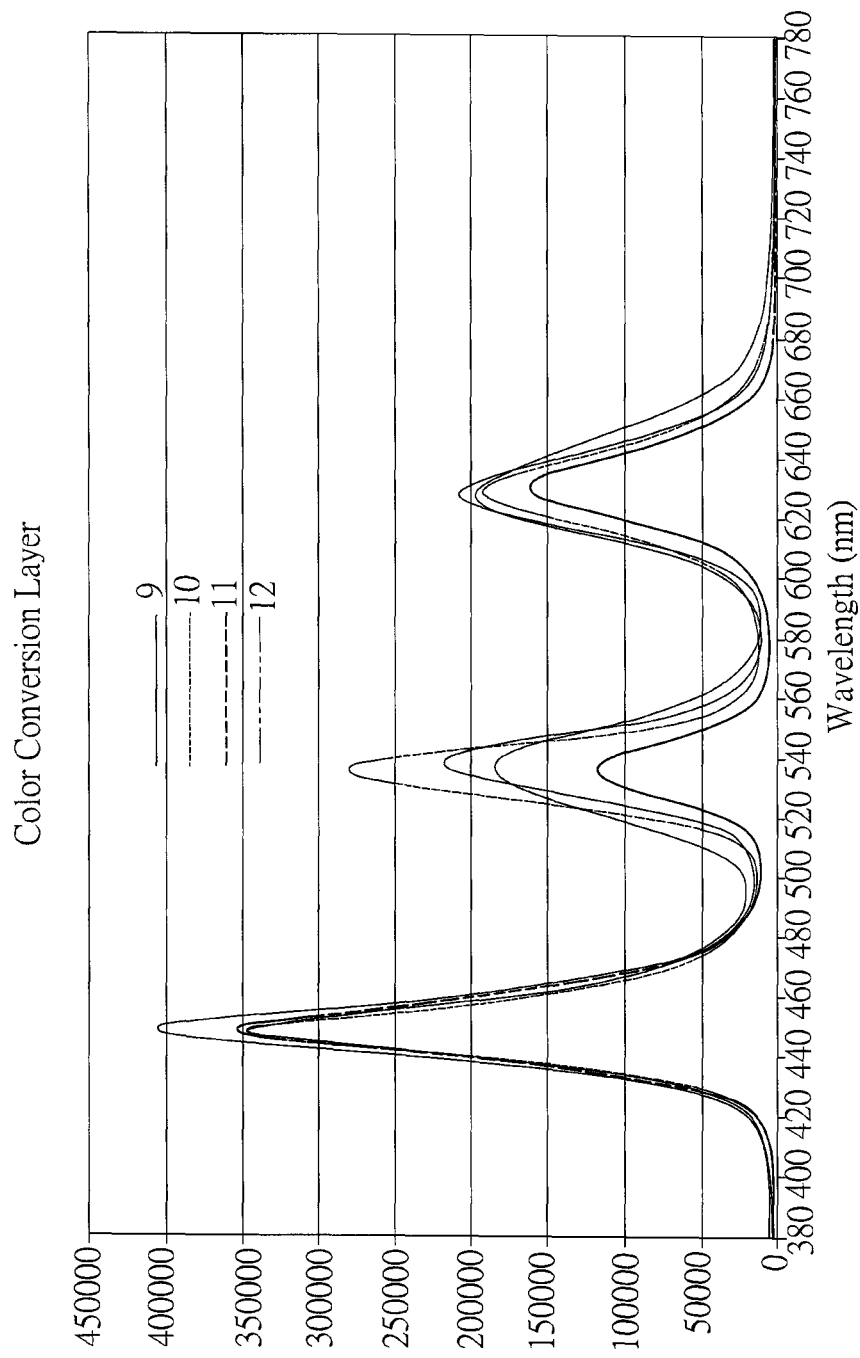
FIG. 2B is a transmittance spectrum diagram of an embodiment of the color conversion layer in the backlight module of the present invention.

Please refer to FIG. 2B, which is a transmittance spectrum diagram of an embodiment of the color conversion layer in the backlight module of the present invention. The color conversion layer 23 is located on the dichroic filter film 22. In this embodiment, the color conversion layer 23 is an optical film containing Quantum Dots (QD) material or fluorescent materials that can convert part of the blue wavelength light energy into red and green wavelengths in order to output white light as required. Since the color conversion layer 23, quantum dots, and fluorescent materials described here are all known in the art and currently available on the market, the details will not be described here.

At least one prism sheet 24, 25 (or called as Brightness Enhancement Film, BEF for short) is located on the color conversion layer 23, which can concentrate scattered light to improve the brightness of the central viewing angle. The prism sheet is an optical film with precise microstructures, and its main material is a polyethylene terephthalate (PET) substrate. Based on the principle of light refraction and reflection, the direction of the light is corrected by the prism sheet, so that the light is concentrated on the front, and the unused light outside the viewing angle can be recycled and used, while improving the overall brightness and uniformity to achieve the effect of brightening. In the present invention, the at least one prism sheet 24, 25 comprises a first prism sheet 24 located above the color conversion layer 23, and a second prism sheet 25 located above the first prism sheet 24. A plurality of long and narrow ridge-like prism structures extending in one direction are respectively provided on the first and second prism sheets 24, 25; in addition, the extension direction of the ridge-like prism structure on the first prism sheet 24 is orthogonal to the extension direction of the ridge-like prism structure on the second prism sheet 25.

Dual Brightness Enhancement Film (DBEF) 26 is located on the at least one prism sheet 24, 25, which can further increase the brightness of the light as well as the range of viewing angles. The production principle of DBEF is to overlap more than 800 layers of polymer films with special birefringence characteristics into one single optical film with a thickness of only 135 μm. The DBEF can effectively reflect the polarized light in the non-penetrating direction back to the backlight module, so it can convert the original non-penetrating polarized light part into the polarized light in the penetrating direction, and let the converted polarized light pass through the DBEF 26, and thus is also called as Reflective Polarizer. When the light source undergoes such repeated action, most of the light that should have been absorbed and wasted is converted into usable effective light; therefore, the brightness of the backlight module 1 can not only be greatly improved, but also the range of viewing angle can also be enlarged.

Figure 3A:
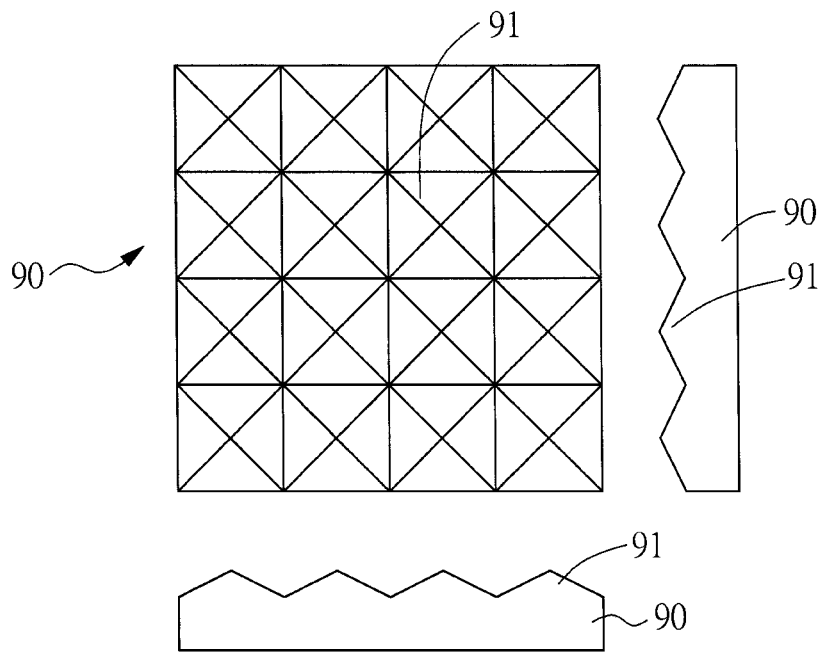
FIG. 3A is a schematic diagram of three-view drawing (top view, front view and side view) of the conventional diffusion plate.
Figure 3B:
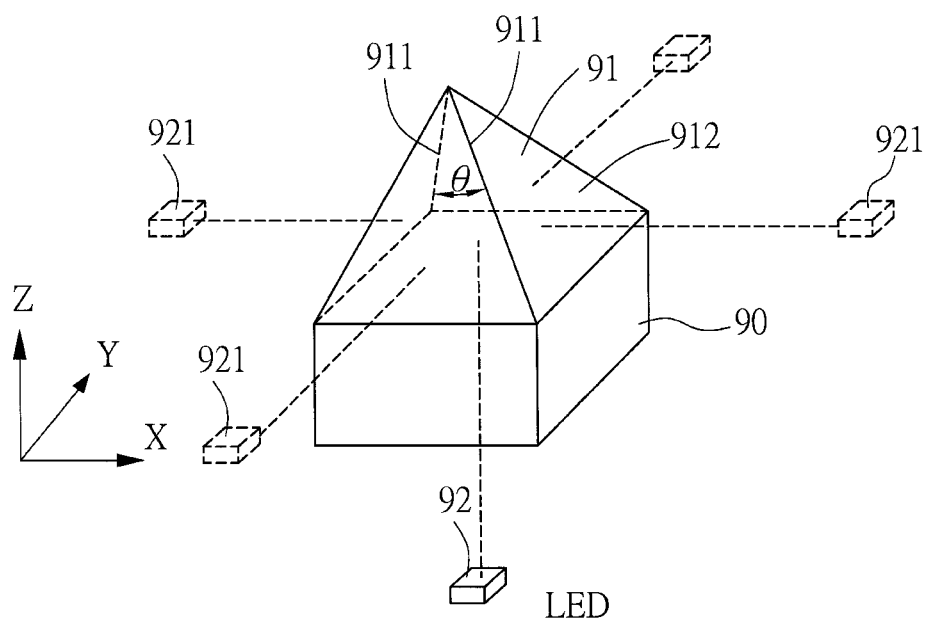
FIG. 3B is a three-dimensional enlarged schematic diagram of a single-vertex pyramid structure formed on a conventional diffusion plate.
Figure 3C:
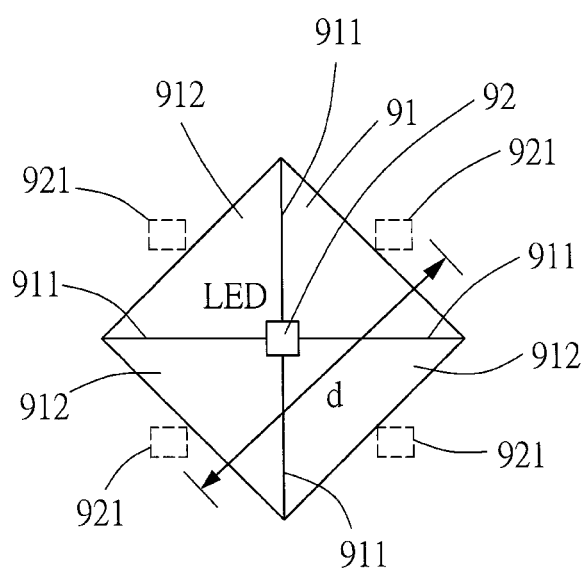
FIG. 3C is a schematic diagram of the light splitting points generated by the single-vertex pyramid structure on the conventional diffusion plate corresponding to the light emitted by the light-emitting element below it.

Please refer to FIG. 3A, FIG. 3B and FIG. 3C. Wherein, FIG. 3A is a schematic diagram of three-view drawing (top view, front view and side view) of the conventional diffusion plate. FIG. 3B is a three-dimensional enlarged schematic diagram of a single-vertex pyramid structure formed on a conventional diffusion plate. FIG. 3C is a schematic diagram of the light splitting points generated by the single-vertex pyramid structure on the conventional diffusion plate corresponding to the light emitted by the light-emitting element below it. The conventional diffusion plate 90 currently available on the market has most of the microstructures on the surface of which are hemispherical or a single-vertex pyramidal structure 91. The so-called "single-vertex pyramid structure 91" is shown in FIG. 3B; wherein, the pyramid structure 91 protruding upward from the upper surface of the diffusion plate 90 has four edges, and the angle θ between the two opposite edges 911 (that is, the vertex angle θ) has only one angle value. When the light-emitting element 92 located directly below the single-vertex pyramid structure 91 emits light upwards, the four side-faces 912 of the conventional single-vertex pyramid structure 91 will respectively cause the light to be refracted or reflected; and therefore, four virtual light splitting points 921 corresponding to the light-emitting element 92 are generated (as shown in FIG. 3B and FIG. 3C), which substantially diffuses a single LED light source into four point-light sources (virtual images of splitting points).

Please refer to FIG. 4, which is a comparison diagram of different light splitting effects and different light splitting distances that can be achieved by a conventional diffusion plate with a single-vertex pyramid structure at different vertex angles θ. The factors that affect the light splitting and diffusing effects are: the vertex angle of the pyramid structure (θ), the distance between the LED and the diffusion plate (OD), the shape and structure of the pyramid structure, the furnishing angle and direction of the structure, the refractive index of the material (nd), etc. The optical simulation conditions of a single LED as which shown in FIG. 4 include: the same single-vertex pyramid structure, convex shape, the same OD (such as 2 mm), the same placement angle of 45°, and the same material refractive index (nd) of 1.59. The "light splitting distance d (mm)" of the conventional single-vertex pyramid structure refers to the straight-line distance between the two splitting points generated by the two opposite side-faces. The so-called "structure placement angle (°)" refers to the angular difference between the bottom side-edge of the conventional single-vertex pyramid structure and the arrangement direction of the light-emitting element array (see FIG. 3C). It can be seen from FIG. 4 that, the conventional diffusion plate with a single-vertex pyramid structure can divide a single LED light source into four point-light sources (virtual images of splitting points). Regardless of its vertex angle θ value of 50°, 70°, 90°, 110° or 130°, the lamp beads of the virtual images of the four splitting points of light produced by the light of the single light-emitting element is still clearly visible. Obviously, its diffusive effect is poor. In addition, it can be seen from FIG. 4 that, under the same OD value, the light splitting distance "d" and the structure's vertex angle θ have an inverse relationship, which can be used as a reference for the design of backlight modules with different LED pitches P and OD values.

The following will derive the mathematical relationship of the light splitting distance "d" of LED when the diffusion plate uses the surface microstructures to provide the light splitting function.

Figure 5B:
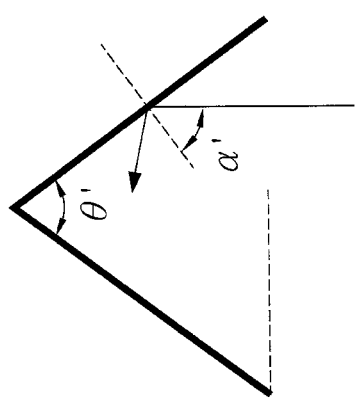
FIG. 5A and FIG. 5B are schematic diagrams of the light path changes of the vertically upward light when the vertex angles of the pyramid structure are $\theta'$ and $\theta''$, respectively.
Figure 5A:
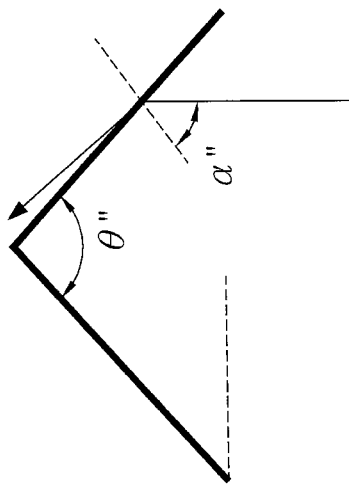

Please refer to FIG. 5A and FIG. 5B, which are schematic diagrams of the light path changes of the vertically upward light when the vertex angles of the pyramid structure are θ' and θ", respectively. First to consider the light deflection of the vertical upward light emitted by the LED on the structural surface (side-face) of the pyramid structure, as shown in FIG. 5A; when the light incident angle α'>α (where α is the critical angle of light of the pyramid structure material), total reflection occurs, the light cannot be emitted, and the observer cannot see the emitted light. As shown in FIG. 5B, when the incident angle of light is α"<α, refraction occurs, the light is deflected and then emerges (emits out), the observer can see the light. Assuming that the refractive index (n) of the material is 1.59, the light critical angle α can be calculated from the formula "α=sin−1(1/n)" to be about 38.97128° (about 39°). It can be seen from FIG. 5A and FIG. 5B that, when α=90−θ/2 is the critical value of light deflection (reflection and refraction), and thus, when the vertex angle of the structure θ=102° (this value can be called "the vertex angle critical value $θ_{thres}$") is the critical value of light deflection in FIG. 5A and FIG. 5B. Therefore, for the discussion of the two light deflection conditions shown in FIG. 5A and FIG. 5B. the mathematical relational expressions need to be divided into two conditions: θ'<102° and θ">102° to calculate and discuss separately Please refer to FIG. 6A and FIG. 6B, which are schematic diagrams of the light path and the position of the light splitting point generated corresponding to the light-emitting element when the vertex angle of the pyramid structure is $θ>θ_{thres}$ and $θ<θ_{thres}$, respectively. Wherein:

∠ CAB is the vertex angle of the pyramid structure θ;

D is the light-emitting position of the light-emitting element (Mini LED), assuming it is a point-light source;

E is the position of the virtual image of the light splitting point caused by a single inclined side surface (side-face);

α is the incident angle of vertical light on the structural surface, and this value is related to the angle of the inclined side surface of the structure;

n is the refractive index of the material (usually referred as "nd", that is, the refractive index of the material for light of wavelength "d");

OD is the optical path distance, that is, the distance between the Mini LED and the structural surface (the side-face of the pyramid structure);

d2 (when $θ>θ_{thres}$) and (d1+d2) (when $θ<—O_{thres}$) are the horizontal light-splitting distance caused by one inclined side surface (side-face) of the structure; and d=2*d2 (when $θ>θ_{thres}$) and d=2*(d1+d2) (when $θ<θ_{thres}$) are the horizontal light-splitting distances of the pyramid structure.

Figure 6A:
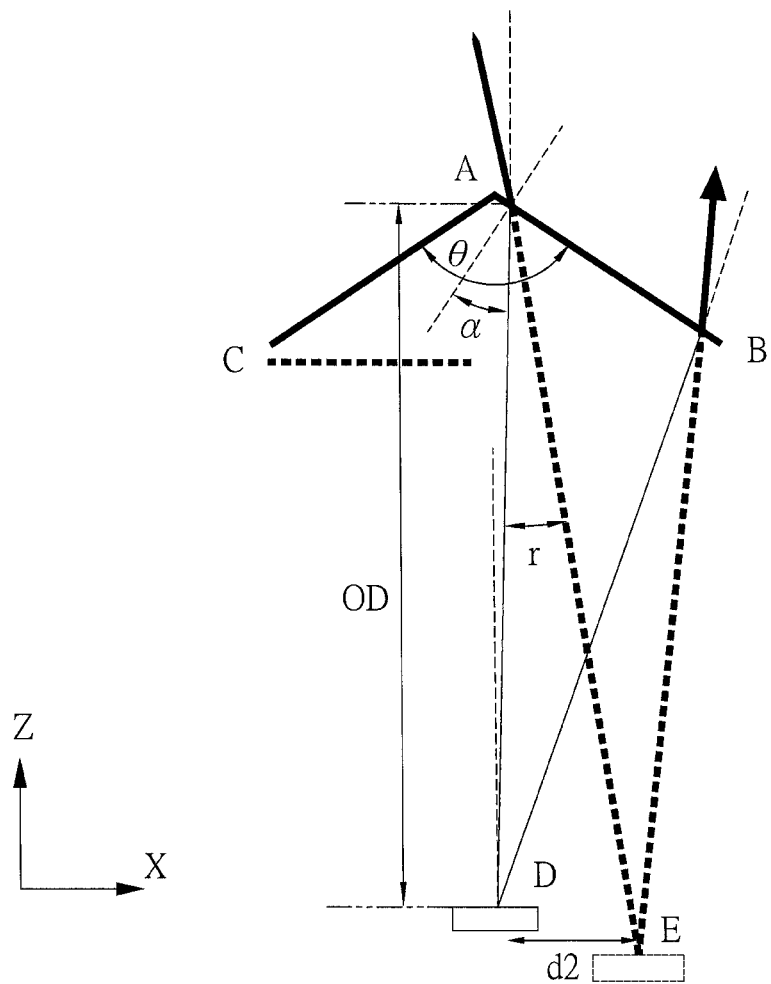
FIG. 6A and FIG. 6B are schematic diagrams of the light path and the position of the light splitting point generated corresponding to the light-emitting element when the vertex angle of the pyramid structure is $\theta > \theta_{thres}$ and $\theta < \theta_{thres}$, respectively.

According to the light path in FIG. 6A, when $θ>θ_{thres}$, the LED at position D generates a light splitting point at position E (only one-sided light splitting is drawn here). The generation of the light splitting point is a virtual image imaging; the imaging position thereof can be interlaced by the reverse dashed lines of two light rays by using geometric optics. The first light ray is the vertical light DA and the second light ray is the oblique light DB, which outputs light (toward the observer) after being refracted by the inclined side surface of the structure. The second light ray is the oblique light which is the visible light within the observer's view angle (around 0.2°). Accordingly, the mathematical relationships between the light deflection angle "r" and the light splitting distance "d" caused by the structure are as follows:

$r=\sin^{-1}(n*\sin\alpha)-\alpha;$ $\alpha=90-\theta/2;$ $d=2*d2=2*OD*\tan r;$ the light splitting distance d is positively correlated with the value of OD.

Figure 6B:
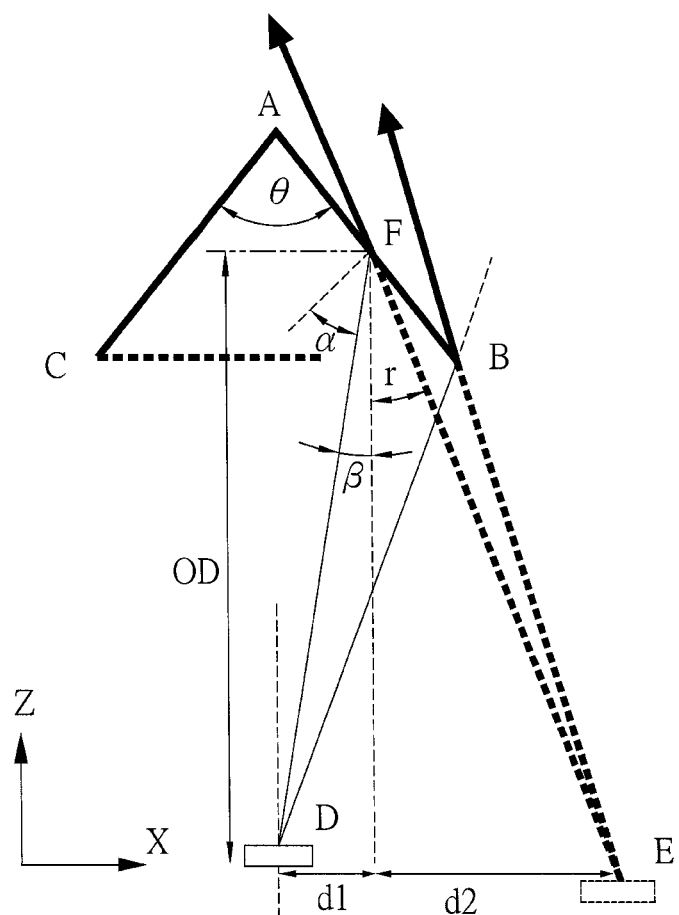
Figure 7:
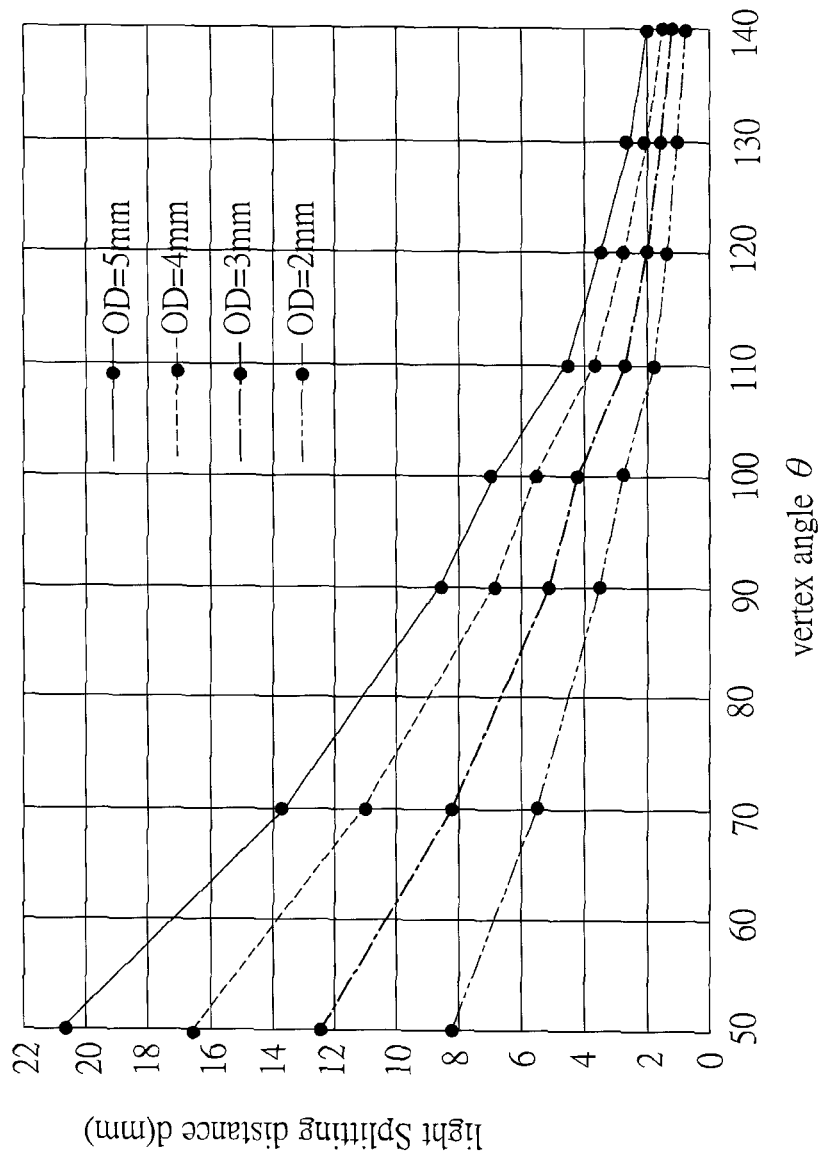
FIG. 7 is a curve diagram showing the corresponding relationship between the vertex angle $\theta$ and the light splitting distance d of the pyramid-like structure of the diffusion plate of the present invention.

According to the light path in FIG. 6B, when $\theta<\theta_{thres}$, the LED at position D generates a light splitting point at position E (only one-sided light splitting is drawn here). The generation of the light splitting point is a virtual image imaging; the imaging position thereof can be interlaced by the reverse dashed lines of two light rays by using geometric optics. The first light ray is an oblique light DA and the second light ray is also an oblique light DB, which outputs light (toward the observer) after being refracted by the inclined side surface of the structure. The first light ray is the oblique light which is the deflected light with the incident light angle α equal to the light critical angle. The angle between the first light ray and the optical axis is β. The mathematical relationship between the deflection angle of the first light (β+r) and the light splitting distance d caused by the structure is as follows:

$d=2*(d1+d2)=2*OD*(\tan\beta+\tan r);$ $\beta=90-\alpha-\theta/2;$ $r=\theta/2-2\alpha.$ According to the aforementioned mathematical expressions derived in FIG. 6A and FIG. 6B, the present invention provides a quantitative relationship between the pyramid structure with different vertex angles θ and the resulting light splitting distance d. By substituting different OD values into the calculation formula, the condition is that the refractive index (nd) is 1.59, and the corresponding relationship between the vertex angle θ and the light splitting distance d of the pyramid-like structure of the diffusion plate of the present invention can be obtained as shown in FIG. 7. It can be seen from FIG. 7 that, when the OD is a fixed value, the larger the vertex angle θ, the smaller the light splitting distance d; relatively, when the vertex angle θ is a fixed value, the larger the OD value is, the greater the light splitting distance d is.

Figure 8A:
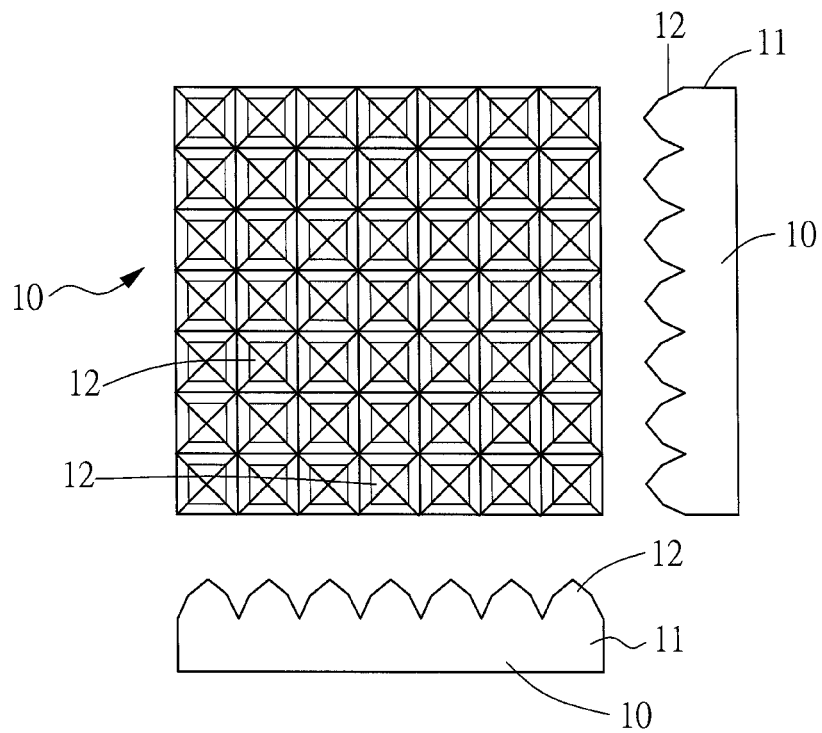
FIG. 8A is a schematic diagram of three-view drawing (top view, front view and side view) of the diffusion plate of the present invention.
Figure 8B:
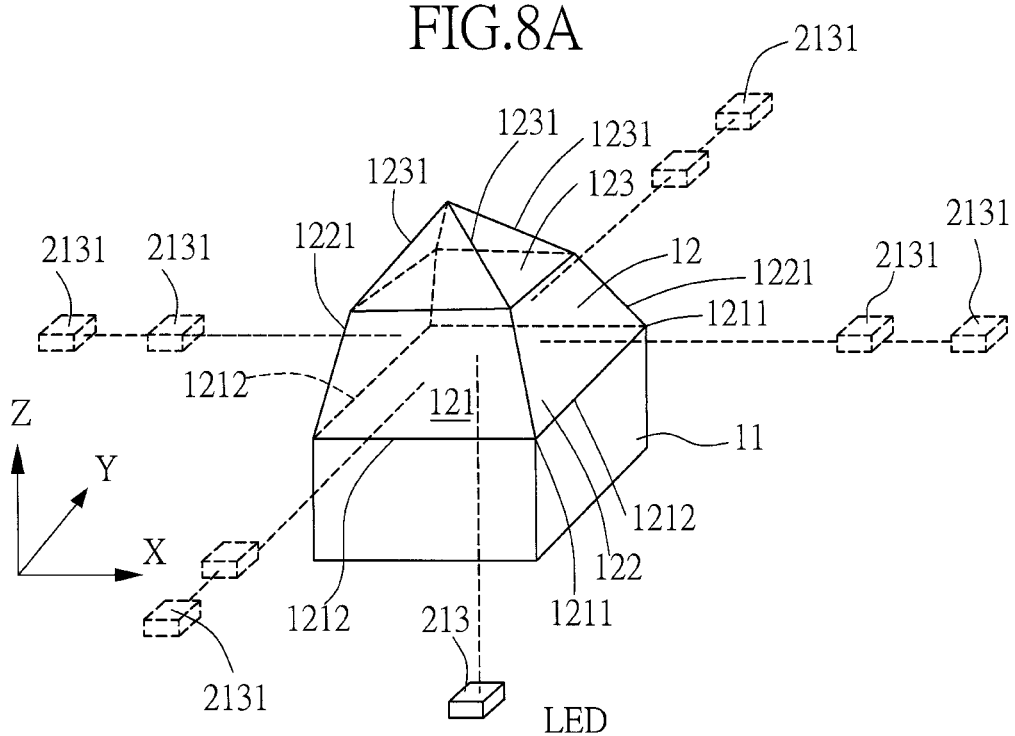
FIG. 8B is a three-dimensional enlarged schematic diagram of a multiple-vertex pyramid-like structure formed on a diffusion plate of the present invention.

Please refer to FIG. 8A and FIG. 8B; in which, FIG. 8A is a schematic diagram of three-view drawing (top view, front view and side view) of the diffusion plate of the present invention; and FIG. 8B is a three-dimensional enlarged schematic diagram of a multiple-vertex pyramid-like structure formed on a diffusion plate of the present invention. The primary technical feature of the diffusion plate 10 of the present invention is that a plurality of pyramid-like structures 12 are arranged in an array on one surface of the diffusion plate 10. Each pyramid-like structure 12 has a bottom surface 121, a first convex portion 122 and a second convex portion 123. Wherein, the first convex portion 122 and the second convex portion 123 have different vertex angles, and therefore the pyramid-like structure 12 can also be called as "pyramid-like structure with multiple vertex angles" or "multiple-vertex pyramid-like structure". In this embodiment, the bottom surface 121 is a rectangular (preferably square) bottom surface and has four vertices 1211 and four bottom edges 1212. The first convex portion 122 protrudes upward from the bottom surface 121 by a first height. The first convex portion 122 includes four first side-edges 1221 extending obliquely upward from the four vertices 1211 of the bottom surface 121, respectively. The four first side-edges 1221 of the first convex portion 122 are not only equal in length but also extend upward at the same first inclination angle. Moreover, the angle between the two opposite first side-edges 1221 (not the two adjacent first side-edges) is called the first vertex angle. The second convex portion 123 protrudes upward from a top of the first convex portion 122 to a second height. The second convex portion 123 includes four second side-edges 1231 extending obliquely upward from the top-ends of the four first side-edges 1221 of the first convex portion 122. The four second side-edges 1231 of the second convex portion 123 are not only equal in length but also extend upward at the same second inclination angle. Moreover, the angle between the two opposite second side-edges 1231 (not the two adjacent second side-edges) is called the second vertex angle. Wherein, the first vertex angle is not equal to the second vertex angle, and therefore, this type of structure is a pyramid-like structure 12 with multiple vertex angles, so it can also be called a "pyramid-like structure with multiple vertex angles" or "multiple-vertex pyramid-like structure". Wherein, the first inclination angle refers to the included angle between the first side-edge 1221 and the bottom surface 121, and the second inclination angle refers to the included angle between the second side-edge 1231 and the bottom surface 121. Both the first inclination angle and the second inclination angle are less than 90°.

Figure 9:
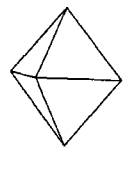
FIG. 9 is a comparison diagram between the conventional diffusion plate with a single-vertex pyramid structure and the diffusion plate with multiple-vertex pyramid-like structures of the present invention that can achieve different light splitting effects and different light splitting distances in condition of different vertex angles $\theta$.
Figure 9:
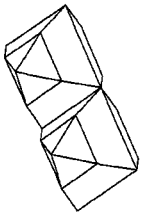
Figure 9:
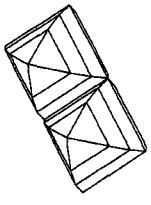
Figure 9:
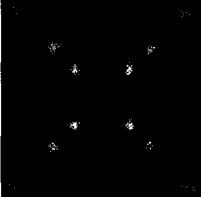
Figure 9:
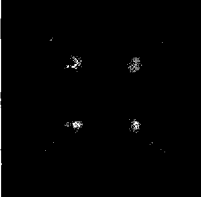
Figure 9:
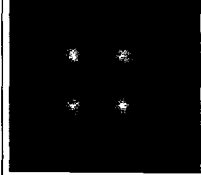

As shown in FIG. 9, which is a comparison diagram between the conventional diffusion plate with a single-vertex pyramid structure and the diffusion plate with multiple-vertex pyramid-like structures of the present invention that can achieve different light splitting effects and different light splitting distances in condition of different vertex angles θ. The present invention uses pyramid-like structures with multiple (two or more) vertex angles to increase the number of light splitting points, thereby enhancing the light splitting effect of the diffusion plate/film. A single Mini LED light source can be divided by the pyramid-like structure of the present invention into at least eight or even more point light sources (light splitting points), which is more than double the number of light splitting points compared to the traditional single-vertex pyramid structure, so it can greatly improve the light diffusion effect.

In the present invention, the light splitting points of the pyramid-like structure with multiple vertex angles will have multiple light splitting distances d' and d". It can be explained based on the relational mathematical expressions obtained by the aforementioned derivation and the diagrams in FIG. 10A, FIG. 10B, and FIG. 10C.

When the mathematical relationship between the vertex angle θ' of the first convex portion, the vertex angle θ" of the second convex portion and the vertex angle's critical value $\theta_{thres}$ of the pyramid-like structure is: $\theta'<\theta"<\theta_{thres}$, then the first light splitting distance d' and the second splitting distance d" of the multiple light splitting points generated by such pyramid-like structure can be calculated by the following mathematical expressions:

$d'=2*OD*[\tan(90-\alpha-\theta'/2)+\tan(\theta'/2-2\alpha)];$ $d"=2*OD*[\tan(90-\alpha-\theta"/2)+\tan(\theta"/2-2\alpha)];$ $\alpha=\sin^{-1}(1/n).$ When the mathematical relationship between the vertex angle θ' of the first convex portion, the vertex angle θ" of the second convex portion and the vertex angle's critical value $\sigma_{thres}$ of the pyramid-like structure is: $\theta">\theta'>\theta_{thres}$, then the first light splitting distance d' and the second splitting distance d" of the multiple light splitting points generated by the pyramid-like structure can be calculated by the following mathematical expressions:

$$d'=2*OD*\tan(r');$$

$$r'=\sin^{-1}(n*\sin\alpha')-\alpha';$$

$$\alpha'=90-\theta'/2;$$

$$d''=2*OD*\tan(r'');$$

$$r''=\sin^{-1}(n*\sin\alpha'')-\alpha'';$$

$$\alpha''=90-\theta''/2.$$

By employing combinations of appropriate values of the light splitting distances d' and d" and the Mini LED pitch P based on the above mathematical expressions, the diffusion plate having pyramid-like structures with multiple vertex angles proposed by the present invention can achieve relatively better optical diffusion effect than the conventional diffusion plate with single-vertex pyramid structures; that is, better light distribution effect with more uniform Mini LED lamp beads.

Figure 10A:
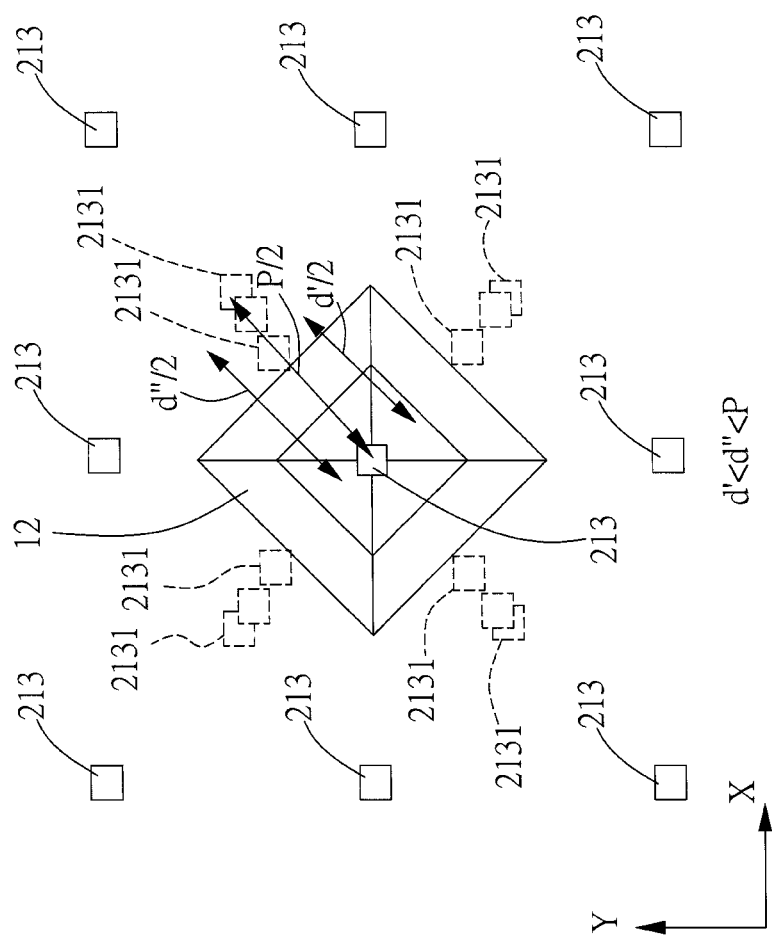
FIG. 10A, FIG. 10B, and FIG. 10C respectively are schematic diagrams of the three different relationships between the pitch (P) of the Mini LED and the light splitting distances (d' and d'') of the light splitting points obtained according to combinations of different vertex angles ($\theta'$, $\theta''$) of the pyramid-like structures of the diffusion plate of the present invention.
Figure 10B:
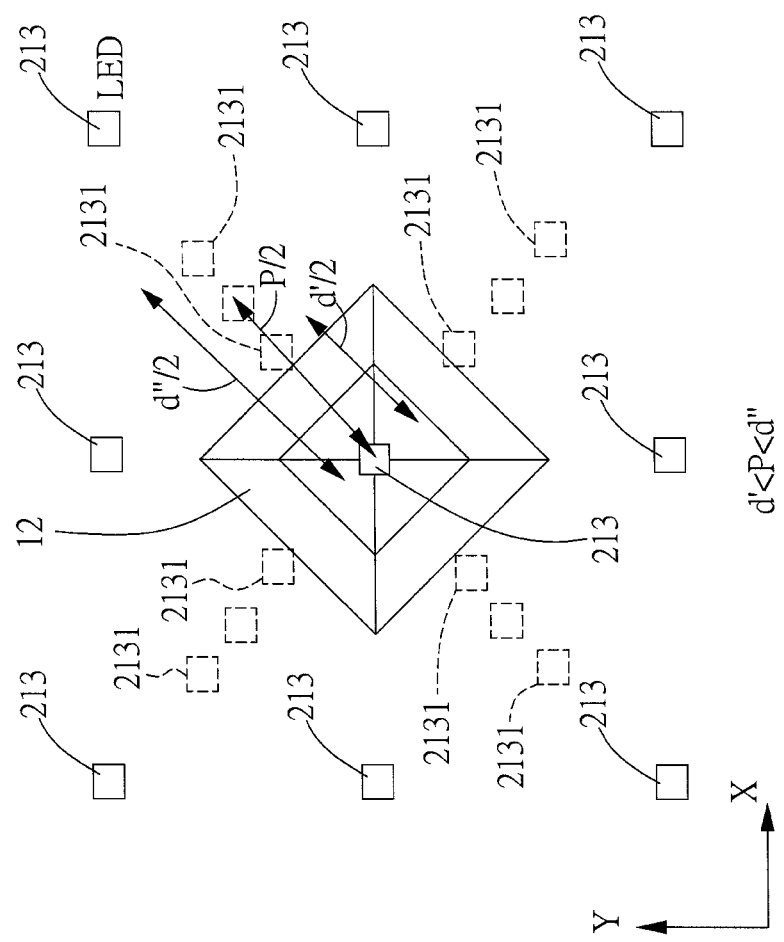
Figure 10C:
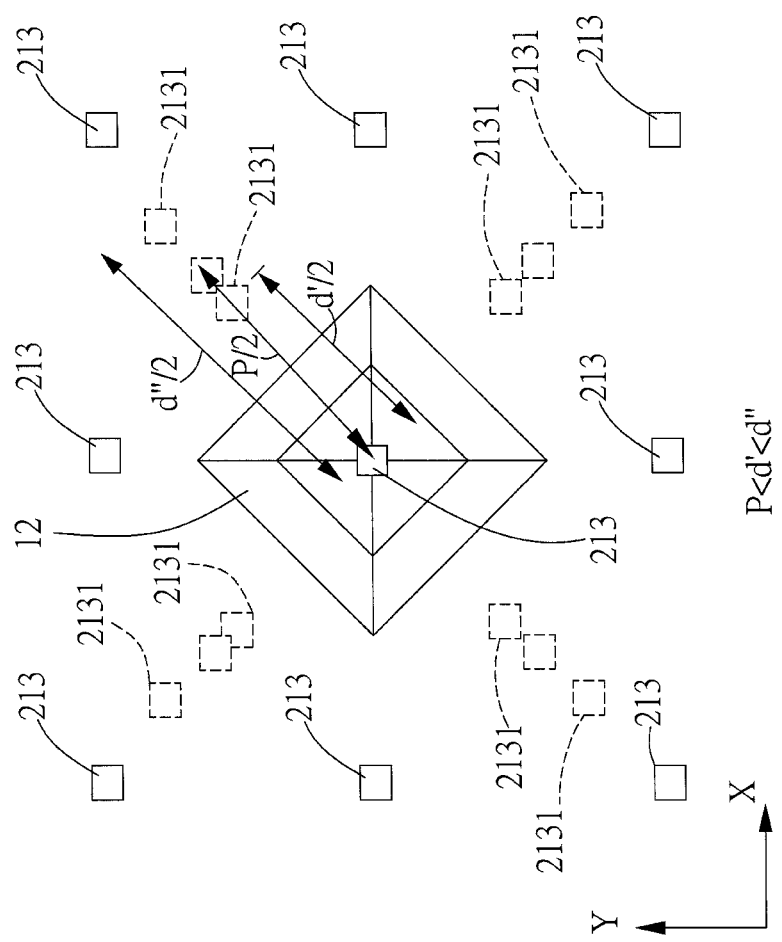

Please refer to FIG. 10A, FIG. 10B, and FIG. 10C, which respectively are schematic diagrams of the three different relationships between the pitch (P) of the Mini LED (light emitting element 213) and the light splitting distances (d' and d") of the light splitting points 2131 obtained according to combinations of different vertex angles (θ', θ") of the pyramid-like structures 12 of the diffusion plate of the present invention. There are three different relationships between (d', d", P); wherein, FIG. 10A schematically shows the relative positional relationship between the light splitting distances (d' and d") and the pitch (P) when d'<d"<P; FIG. 10B schematically shows the relative positional relationship between the light splitting distances (d' and d") and the pitch (P) when d'<P<d"; FIG. 10C schematically shows the relative positional relationship between the light splitting distances (d' and d") and the pitch (P) when P<d'<d".

Figure 12:
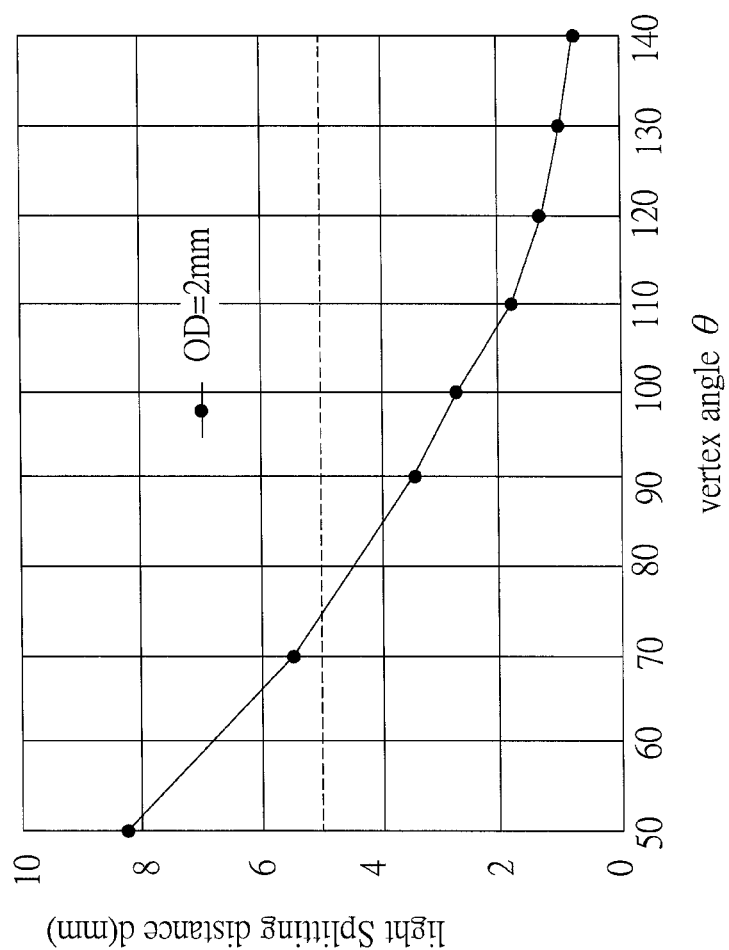
FIG. 12 is a schematic curve diagram of the corresponding relationship between the vertex angle $\theta$ and the light splitting distance d of the multiple-vertex pyramid-like structures of the diffusion plate of the present invention according to the simulation results of FIG. 11.

Please refer to FIG. 11 and FIG. 12. FIG. 11 is a comparison diagram between various optical simulation results of the diffusion plate with multiple-vertex pyramid-like structures of the present invention with different light splitting distances and pitches (d', d", P) according to different vertex angles (θ', θ") that can achieve different light splitting effects. FIG. 12 is a schematic curve diagram of the corresponding relationship between the vertex angle θ and the light splitting distance d of the multiple-vertex pyramid-like structures of the diffusion plate of the present invention according to the simulation results of FIG. 11. In these simulations, the refractive index of the diffusion material is n=1.59, and the distance (OD value) between the Mini LED and the bottom surface of the pyramid-like structures with multiple vertex angles is 2 mm (i.e., OD=2 mm). The light splitting distance of the inclined side-face structure under OD=2 mm is less than 8 mm, so the maximum pitch distance P between adjacent Mini LEDs must be less than 8 mm (i.e., P<8 mm). These simulations compare the light-splitting diffusion effects of homogenized lamp beads of Mini LEDs when different vertex angles (θ', θ") in different distances/pitch relations (d', d", P) are applied to the diffusion plate with multiple-vertex pyramid-like structures of the present invention.

Simulation conditions require the use of more optical films, such as the addition of two prism sheets (90-50 μm), multiple Mini LEDs (e.g. the same four Mini LEDs), matrix Mini LED spacing (e.g. the distance between two adjacent Mini LEDs is 5 mm), the same OD value (e.g. 2 mm). It can be seen from FIG. 11 that, under the above simulation conditions, when d'<P<d" and θ'=60° (θ' is preferably between 40° and) 60°, and θ"=90° (θ" is preferably between 60° and 90°), the diffusion plate having the pyramid-like structures with multiple vertex angles of the present invention can obtain the best light-splitting diffusion effect (that is, the lamp beads effect is not visible).

Figure 13A:
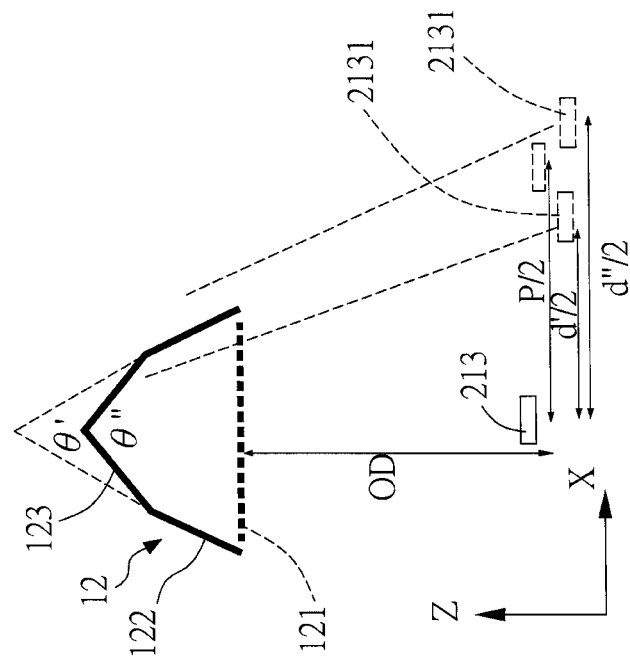
FIG. 13A and FIG. 13B respectively are schematic diagrams of the positions of the light splitting points generated according to the light path of the light-emitting element in two different structures of the pyramid-like structure with multiple vertex angles of the present invention.
Figure 13B:
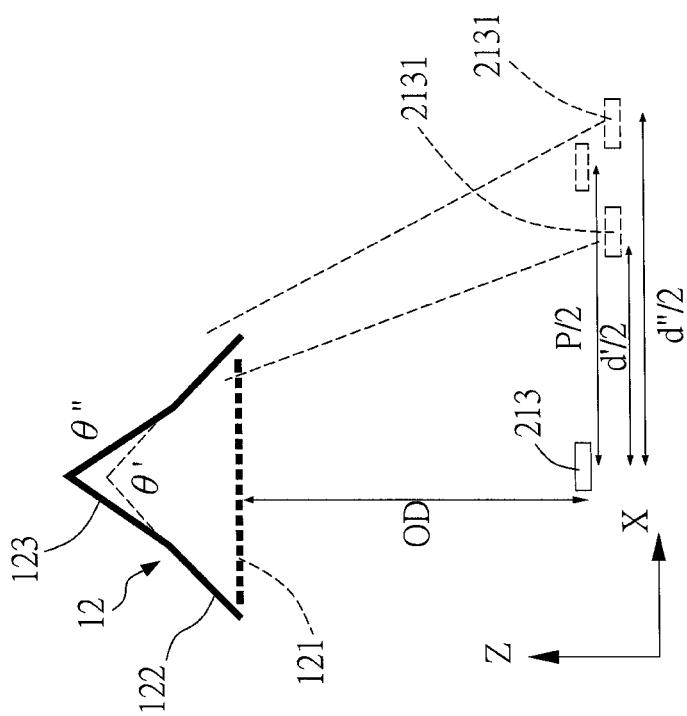

Please refer to FIG. 13A and FIG. 13B, which respectively are schematic diagrams of the positions of the light splitting points generated according to the light path of the light-emitting element in two different structures of the pyramid-like structure with multiple vertex angles of the present invention.

It can be seen from FIG. 13A and FIG. 13B that, the pyramid-like structure of the present invention has multiple vertex angles, no matter if the vertex angle θ' of the first convex portion is greater than the vertex angle θ" of the second convex portion as shown in FIG. 13A, or the vertex angle θ' of the first convex portion is smaller than the vertex angle θ" of the second convex portion as shown in FIG. 13B, the light splitting distances d' and d" and the light diffusing effect that can be achieved by these two structures are roughly the same. However, when considering the ease and yield of manufacturing of the diffusion plate, the present invention adopts the preferred embodiment of the pyramid-like structure with multiple vertex angles as shown in FIG. 13B.

Please refer to FIG. 8A and FIG. 8B, and also refer to FIG. 10A, FIG. 10B and FIG. 10C at the same time. In a preferred embodiment, the plurality of light-emitting elements 213 in the backlight module 1 of the present invention are arranged on the substrate 21 in a rectangular array along an X-axis direction and a Y-axis direction perpendicular to each other. The plurality of light-emitting elements 213 at least comprises a first light-emitting element, a second light-emitting element, a third light-emitting element, and a fourth light-emitting element adjacently arranged at the four apex positions of a rectangular block (preferably square block). A line segment defined by the first light-emitting element and the second light-emitting element as its two end points is parallel to the X-axis direction; in addition, another line segment defined by the first light-emitting element and the fourth light-emitting element as its two end points is parallel to the Y-axis. Moreover, the included angle between the line segment formed by the first light-emitting element and the third light-emitting element and the X-axis direction is approximately 45° and is the diagonal line of the rectangular block. The first light-emitting element is substantially located below a center point of the bottom surface 121 of one of the pyramid-like structures 12, and emits light substantially upward toward a Z-axis direction. The Z-axis direction, the X-axis direction and the Y-axis direction are all perpendicular to each other. The first convex portion 121 of the pyramid-like structure 12 has four first side-faces 1222 formed (defined) by four first side-edges 1221. All of these first side-faces 1222 and the first side-edges 1221 are extending inclinedly upward from the bottom surface 121 defined by the bottom edges 1212. The four first side-faces 1222 can respectively refract the light emitted by the first light-emitting element 213 and thereby generate a first light-splitting point 2131 corresponding to the light-emitting element 213. Similarly speaking, the second convex portion 123 of the pyramid-like structure 12 has four second side-faces 1232 formed (defined) by four second side-edges 1231. These second side-faces 1232 and the second side-edges 1231 are respectively extending inclinedly upward from the top side (top end) of their corresponding first side-face 1222 or first side-edge 1221. The four second side-faces 1232 can respectively refract the light emitted by the first light-emitting element 213 and thereby generate a second light-splitting point 2131 corresponding to the light-emitting element 213.

Wherein, the distance (i.e., the pitch) between the first light-emitting element and the third light-emitting element is P. The distance between the first light-emitting element 213 and the structural surface of the pyramid-like structure 12 (that is, the side-face where the light is emitting out of) is OD. However, since the height of the pyramid-like structure 12 itself is relatively small compared to the OD value, for the convenience of calculation, the height of the pyramid-like structure 12 itself can be ignored, and thereby simply use the distance between the first light-emitting element and the bottom surface of the pyramid-like structure as the OD. The distance between the first light-emitting element 213 and the first light splitting point 2131 is d'/2, the distance between the first light-emitting element and the second light splitting point is d''/2, the first vertex angle is θ', the second apex angle is θ'', the refractive index of the material of the diffusion plate 10 is n, and the light critical angle is α. Therefore, according to the mathematical expressions derived above, it can be known that, when the shape of the pyramid-like structure 12 of the present invention meets the following mathematical conditions, a relatively optimal spectral diffusion effect can be obtained:

$\alpha = \sin^{-1}(1/n)$;

$d' < P < d''$;

$d' = 2*OD*(\tan(90-\alpha-\theta'/2) + \tan(\theta'/2 - 2\alpha))$;

$d'' = 2*OD*(\tan(90-\alpha-\theta''/2) + \tan(\theta''/2 - 2\alpha))$;

wherein, the material refractive index n value (or nd value) of the diffusion plate is 1.59 (n=1.59); 5 mm≤P≤10 mm; 0 mm<OD≤5 mm; the applicable range of the length W of the bottom edge of the bottom surface of the pyramid-like structure is 0.05 mm≤W≤1 mm (preferably 0.05 mm≤W≤0.5 mm); The range of the height H' of the first convex portion in the Z-axis direction is 0.1 mm≤H'≤2 mm (in an embodiment, the height H' is the distance between the bottom surface of the diffusion plate and the top end of the first side-edge); the range of the height H'' of the second convex portion in the Z-axis direction is 0.05 mm≤H''≤1 mm.

In a preferred embodiment of the present invention, the angle of one of the first vertex angle θ' and the second vertex angle θ'' is between 40° and 60°, and the other one is between 60° and 90°.

In a more preferred embodiment of the present invention, the angle of the first vertex angle is smaller than the angle of the second vertex angle, that is, θ'<θ''. The first vertex angle θ' is between 40° and 60°, and the second vertex angle θ'' is between 60° and 90°; and, P=10 mm, OD=3 mm.

Figure 14:
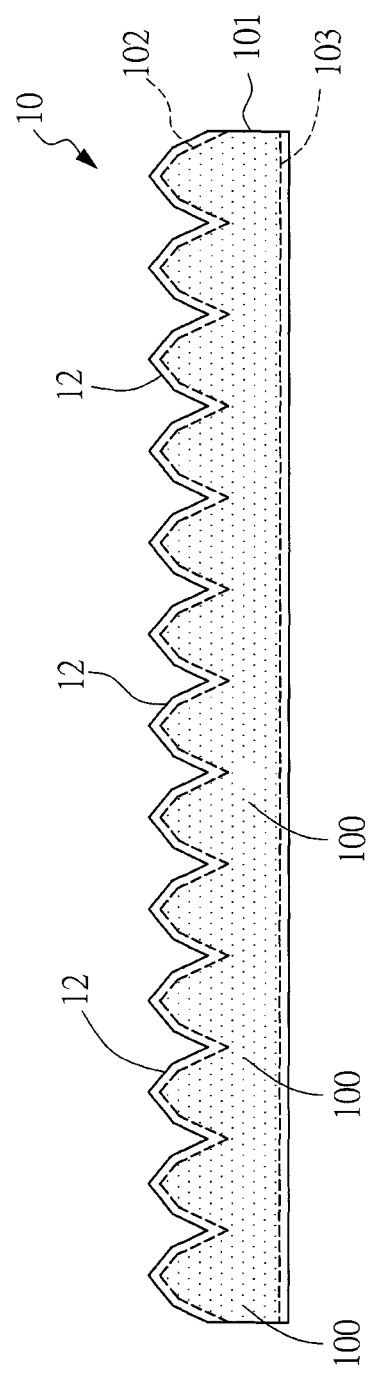
FIG. 14 is a schematic cross-sectional view of another embodiment of the diffusion plate with multiple-vertex pyramid-like structures of the present invention.

Please refer to FIG. 14, which is a schematic cross-sectional view of another embodiment of the diffusion plate with multiple-vertex pyramid-like structures of the present invention. In this embodiment, the diffusion plate 10 of the present invention is a multi-layer structure composed of at least two layers of different materials by coextrusion process; the average light penetration rate of the diffusion plate 10 is ranging from 70% to 95%. A plurality of diffusion particles 100 are contained in the diffusion plate 10 of the multilayer structure. The material of the diffusion particles 100 includes one of the following: silicon dioxide ($SiO_2$), titanium dioxide ($TiO_2$), polymethylmethacrylate (PMMA), polystyrene (PS), polycarbonate (PC), polypropylene (PP), or copolymer of the aforementioned materials. The particle diameter of the diffusion particles 100 ranges from 0.5 to 10 μm, and the weight percentage of concentration ranges from 1 to 10% wt.

In a preferred embodiment, the diffusion plate 10 has a three-layer structure which includes: an engineering plastic layer 101 containing polycarbonate (PC) and located in the middle, an upper acrylic (Polymethyl Methacrylate; PMMA) layer 102 located above the engineering plastic layer 101, and a lower acrylic layer 103 located below the engineering plastic layer 101. The refractive index difference range between these three layers of the diffusion plate 10 is between 0.01 and 0.1. The lower surface of the plate body 11 of the diffusion plate 10 is a light-input surface, and the lower acrylic layer 103 includes at least one high reflectance material. The high reflectance material has a reflection wavelength range of 400-510 nm, an average reflectance higher than 70%, and contains at least one of the following inorganic substances: silicon dioxide ($SiO_2$), titanium dioxide ($TiO_2$), calcium carbonate, magnesium carbonate, calcium sulfate, magnesium sulfate, and so on. Wherein, the thickness of the engineering plastic layer 101 accounts for 60%-99.99% of the total thickness of the diffusion plate 10, and the thickness of the upper and lower acrylic layers 102 and 103 on the upper and lower sides of the engineering plastic layer 101 account for 0.01%-40% of the total thickness of the diffusion plate 10.

Figure 15:
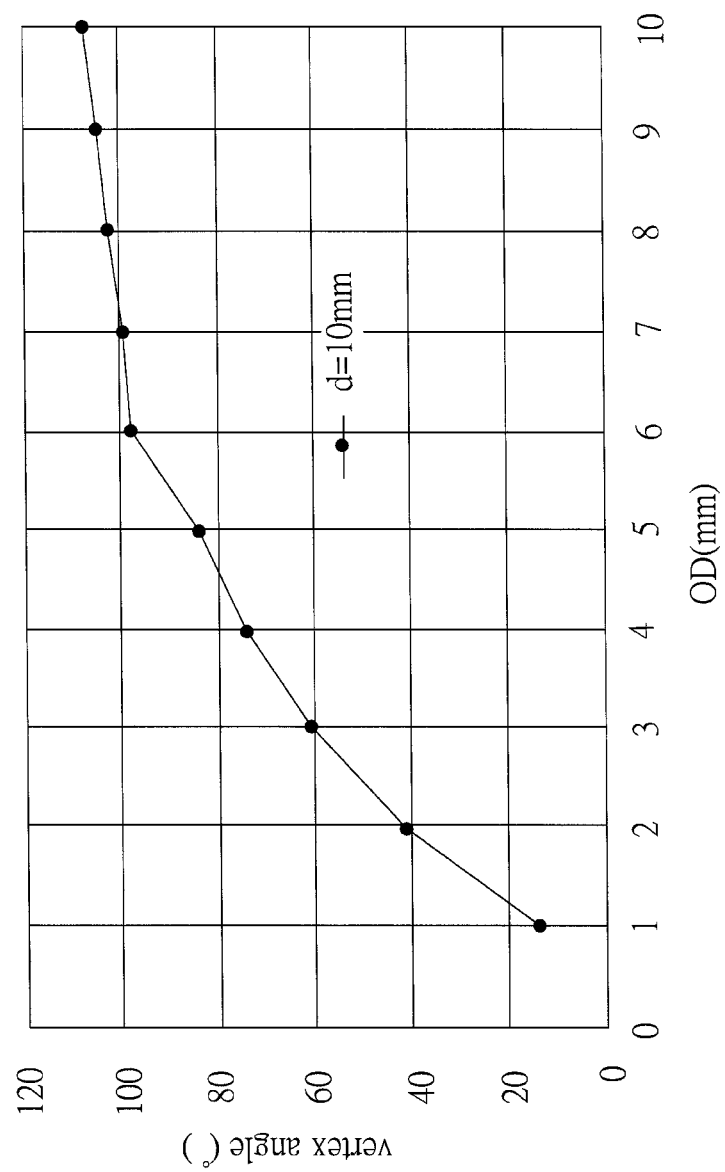
FIG. 15 is a schematic curve diagram showing the relationship between single vertex angle and OD value of the diffusion plate with multiple-vertex pyramid-like structures of the invention.

The present invention also provides a design method that can assist in the design of the optimal set of the multiple vertex angles θ' and θ'' (θ'<θ'') of the pyramid-like structure and minimum OD value of the diffusion plate of the present invention. When providing a set of matrix Mini LEDs with predetermined pitch, such as P=10 mm, Px=Py=10/1.414, an objective of the invention is to design a diffusion plate with multiple-vertex pyramid-like structures that can achieve the effect of homogenizing Mini LED lamp beads under the minimum OD value (such as less than 5 mm). According to the light splitting distances d' and d'' of the pyramid-like pyramids of the present invention, the optimum range is d''<P<d'. When the maximum distance between two adjacent Mini LEDs is P=10 mm and is equal to the light splitting distance d, according to the previous discussed mathematical relationship (material refractive index nd=1.59), the relationship between single vertex angle and OD value is shown in FIG. 15. It can be seen from FIG. 15 that, the smaller the OD value, the smaller the single vertex angle, that is, a sharper angle pyramid-like structure is needed to achieve the splitting distance d=10 mm. However, it is difficult to achieve carving and productivity of less than 40° vertex angle in the production of the pyramid-like structure. If the vertex angle is too small, the mold structure is easy to collapse and the production yield is reduced. Therefore, the OD value of 3 mm is already the minimum limit in current technology. At this stage, according to FIG. 15, it can be seen that the vertex angle is 60°. And then, evaluate the combination of vertex angles θ' and θ" (θ'<θ") for the best uniform Mini LED lamp bead effect under OD=3 mm by optical simulations, and the result is shown in FIG. 16. Using the conditional range of the light splitting distance (d', d") of the three types of pyramid-like structures of the present invention, the best uniform Mini LED lamp bead effect can be obtained when d"<(P=10 mm)<d". Therefore, when the design embodiment of the diffusion plate of the present invention satisfies the mini LED pitch P=10 mm, and the vertex angles of the pyramid-like structure at the shortest OD distance of 3 mm is 50° and 70°, the best light diffusion effect will be achieved.

The following discloses another embodiment for designing the pyramid-like structure with multiple vertex angles of the diffusion plate of the present invention.

According to above discussions, the optimal range of the splitting distances d' and d" of the pyramid-like structure must meet this condition: d"<P<d' (P is the LED pitch). From the formula derived above, it can be seen that the light splitting distances d' and d" are related to OD and the vertex angles θ' and θ" of the pyramid-like structure. In which, the value of OD is the backlight module parameter (must be a known value). Therefore, the optimal range of the pyramid-like structures of the diffusion plate of the present invention used in different backlight modules will require different optimal range values of vertex angles θ' and θ" due to different backlight parameters. That is, it is necessary to discuss the range of the relationship between d', d" and P, and to correspond to the range of the vertex angles θ' and θ" of the pyramid-like structure.

Please refer to the Table 3 below. Table 3 lists the determination results of the spectroscopic simulation diagram under different Δd' and Δd" spectroscopic positions, with known parameters P=10 mm (same as above) and OD=3 mm as described above. The definitions of the parameters listed in the Table 3 include:

$$\Delta d' = (1/2)*(P-d');$$

$$\Delta d'' = (1/2)*(d''-P);$$

wherein, Δd' and Δd" are the distances between the light splitting distances and the midpoint of the LED pitch, which can represent the position of each light splitting point.

TABLE 3

Determination results of the spectroscopic simulation diagram under different Δd' and Δd" spectroscopic positions (P = 10 mm; OD = 3 mm)

| Δd'(mm) Δd"(mm) Light splitting effect | | Vertex angle θ' Light splitting distance d'(mm) | | | | | |
|---|---|---|---|---|---|---|---|
| | | θ' = 50° d' = 12.4 | θ' = 60° d' = 10.3 | θ' = 70° d' = 8.2 | θ' = 80° d' = 7.1 | θ' = 90° d' = 5.3 | θ' = 100° d' = 4.1 |
| Vertex angle θ" Light splitting distance d"(mm) | θ" = 50° d" = 12.4 | X | X | X | X | X | X |
| | θ" = 60° d" = 10.3 | X | X | X | X | X | X |
| | θ" = 70° d" = 8.2 | Δd' = 1.2 Δd" = 0.9 ○ | Δd' = 0.15 Δd" = 0.9 Δ | X | X | X | X |
| | θ" = 80° d" = 7.1 | Δd' = 1.2 Δd" = 1.45 ○ | Δd' = 0.15 Δd" = 1.45 Δ | X | X | X | X |
| | θ" = 90° d" = 5.3 | Δd' = 1.2 Δd" = 2.35 ○ | Δd' = 0.15 Δd" = 2.35 Δ | X | X | X | X |
| | θ" = 100° d" = 4.1 | Δd' = 1.2 Δd" = 2.95 Δ | Δd' = 0.15 Δd" = 2.95 Δ | X | X | X | X |
| | θ" = 110° d" = 2.7 | Δd' = 1.2 Δd" = 3.65 Δ | Δd' = 0.15 Δd" = 3.65 Δ | X | X | X | X |

In the above Table 3, the symbols "○", "Δ" and "X" are corresponding to the light splitting effects determined based on the (θ', Δd'), (θ", Δd") values referring to the cell of the symbol. Wherein, the symbol "○" means the lamp bead is invisible and thus the light splitting effect is the best; the symbol "Δ" means the lamp bead is slightly visible and thus the light splitting effect is so far so good and is barely acceptable; the symbol "X" means the lamp bead is visible and thus the light splitting effect is poor and not acceptable.

It can be seen from Table 3 that, for those cells where the condition of d"<P<d' is not satisfied, the determined results of light splitting effect are all marked with symbol "X" (the light splitting effect is poor), which verifies our previous discussions. When the combination of vertex angles (θ', θ") is in the range of (50°-60°, 70°-110°), acceptable light splitting effects can be obtained. When the combination of vertex angles (θ', θ") is in the range of (50°, 70°-90°), the best light splitting effects can be achieved.

Please refer to the Table 4 below. Table 4 lists the determination results of the spectroscopic simulation diagram under different Δd' and Δd" spectroscopic positions, with known parameters P=10 mm (same as above) and OD=5 mm as described above.

TABLE 4

Determination results of the spectroscopic simulation diagram under different Δd' and Δd" spectroscopic positions (P = 10 mm; OD = 5 mm)

|  | Δd'(mm) Δd"(mm) Light splitting effect | Vertex angle θ' Light splitting distance d'(mm) | | | | | |
| --- | --- | --- | --- | --- | --- | --- | --- |
|  |  | θ' = 50° d' = 20.7 | θ' = 60° d' = 17.6 | θ' = 70° d' = 13.7 | θ' = 80° d' = 11.3 | θ' = 90° d' = 8.5 | θ' = 100° d' = 6.9 |
| Vertex angle θ" Light splitting distance d"(mm) | θ" = 50° d" = 20.7 | X | X | X | X | X | X |
|  | θ" = 60° d" = 17.6 | X | X | X | X | X | X |
|  | θ" = 70° d" = 13.7 | X | X | X | X | X | X |
|  | θ" = 80° d" = 11.3 | X | X | X | X | X | X |
|  | θ" = 90° d" = 8.5 | Δd' = 5.35 Δd" = 0.75 Δ | Δd' = 3.8 Δd" = 0.75 Δ | Δd' = 1.85 Δd" = 0.75 Δ | Δd' = 0.65 Δd" = 0.75 O | X | X |
|  | θ" = 100° d" = 6.9 | Δd' = 5.35 Δd" = 1.55 Δ | Δd' = 3.8 Δd" = 1.55 Δ | Δd' = 1.85 Δd" = 1.55 O | Δd' = 0.65 Δd" = 1.55 Δ | X | X |
|  | θ" = 110° d" = 4.5 | Δd' = 5.35 Δd" = 2.75 Δ | Δd' = 3.8 Δd" = 2.75 O | Δd' = 1.85 Δd" = 2.75 O | Δd' = 0.65 Δd" = 2.75 Δ | X | X |

It can be seen from Table 4 that, for those cells where the condition of d"<P<d' is not satisfied, the determined results of light splitting effect are all marked with symbol "X" (the light splitting effect is poor), which verifies our previous discussions. When the combination of vertex angles (θ', θ") is in the range of (50°-80°, 90°-110°), acceptable light splitting effects can be obtained. When the combination of vertex angles (θ', θ") is either one of (60°-70°, 70°-90°), (70°,100°) or (80°,90°), the best light splitting effects can be achieved. When comparing the contents of Table 3 and Table 4, it can be understood that, when the OD value increases from 3 mm to 5 mm, the applicable ranges of vertex angles (θ', θ") will also increase for achieving the best light splitting effects.

According to the above Table 3 and Table 4, the ratio of Δd' and Δd" where the lamp bead effect is not visible is sorted out as shown in the Table 5 and Table 6 below.

TABLE 5

The ratio of Δd' and Δd" where the lamp bead effect is not visible (regarding to Table 3 where P = 10 mm; OD = 3 mm)

|  | 1-1 | 1-2 | 1-3 |
| --- | --- | --- | --- |
| Δd' | Δd' = 1.2 | Δd' = 1.2 | Δd' = 1.2 |
| Δd" | Δd" = 0.9 | Δd" = 1.45 | Δd" = 2.35 |
| Light splitting effect | O | O | O |
| Δd"/Δd' | 0.75 | 1.21 | 1.958 |

TABLE 6

The ratio of Δd' and Δd" where the lamp bead effect is not visible (regarding to Table 4 where P = 10 mm; OD = 5 mm)

|  | 2-1 | 2-2 | 2-3 | 2-4 |
| --- | --- | --- | --- | --- |
| Δd' | Δd' = 3.8 | Δd' = 1.85 | Δd' = 1.85 | Δd' = 0.65 |
| Δd" | Δd" = 2.75 | Δd" = 1.55 | Δd" = 2.75 | Δd" = 0.75 |
| Light splitting effect | O | O | O | O |
| Δd"/Δd' | 0.723 | 0.837 | 1.486 | 1.154 |

It can be understood from the Table 5 and Table 6 that, the best optical effect can be achieved when the ratio of Δd' and Δd" (Δd"/Δd') is in the range of 0.7<(Δd"/Δd')<2.

While the present invention has been particularly shown and described with reference to a preferred embodiment, it will be understood by those skilled in the art that various changes in form and detail may be without departing from the spirit and scope of the present invention.

What is claimed is:

1. A diffusion plate capable of being assembled to a backlight module; said backlight module comprising a substrate and a plurality of light-emitting elements arranged in an array on the substrate; said diffusion plate being located above the substrate and comprising:
   a plate body; said plate body having an upper surface and a lower surface;
   a plurality of pyramid-like structures, arranged in an array on the upper surface of the plate body;
   wherein, each said pyramid-like structure comprises:
   a bottom surface, the bottom surface is rectangular and has four vertices and four bottom edges;
   a first convex portion, said first convex portion protrudes upward from the bottom surface by a first height; the first convex portion includes four first side-edges extending obliquely upward from the four vertices of the bottom surface, respectively; the four first side-edges of the first convex portion are not only equal in length but also extend upward at a same first inclination angle; wherein an angle between two opposite said first side-edges is a first vertex angle;
   a second convex portion, protrudes upward from a top of the first convex portion to a second height; the second convex portion includes four second side-edges extending obliquely upward from top-ends of the four first side-edges of the first convex portion; the four second side-edges of the second convex portion are not only equal in length but also extend upward at a same second inclination angle; wherein an angle between two opposite said second side-edges is a second vertex angle;

wherein, the first vertex angle is not equal to the second vertex angle, and therefore, the pyramid-like structure has multiple vertex angles;

wherein, the light-emitting elements are arranged on the substrate in a rectangular array along an X-axis direction and a Y-axis direction perpendicular to each other; the light-emitting elements at least comprises a first light-emitting element, a second light-emitting element, a third light-emitting element, and a fourth light-emitting element adjacently arranged at four apex positions of a rectangular block; a line segment defined by the first light-emitting element and the second light-emitting element as its two end points is parallel to the X-axis direction, in addition, another line segment defined by the first light-emitting element and the fourth light-emitting element as its two end points is parallel to the Y-axis; the included angle between the line segment formed by the first light-emitting element and the third light-emitting element and the X-axis direction is approximately 45° and is a diagonal line of the rectangular block; the first light-emitting element is substantially located below a center point of the bottom surface of one of the pyramid-like structures, and emits light substantially upward toward a Z-axis direction; the Z-axis direction, the X-axis direction and the Y-axis direction are all perpendicular to each other;

the first convex portion of the pyramid-like structure has four first side-faces formed by said four first side-edges; each said first side-face is able to refract the light emitted by the first light-emitting element and thereby generate a first light-splitting point corresponding to the light-emitting element;

the second convex portion of the pyramid-like structure has four second side-faces formed by said four second side-edges; each said second side-face is able to refract the light emitted by the first light-emitting element and thereby generate a second light-splitting point corresponding to the light-emitting element;

the distance between the first light-emitting element and the third light-emitting element is P; the distance between the first light-emitting element and the bottom surface of the pyramid-like structure is OD; the distance between the first light-emitting element and the first light splitting point is d'/2; the distance between the first light-emitting element and the second light splitting point is d"/2; the first vertex angle is θ'; the second apex angle is θ"; a refractive index of material of the diffusion plate is n, and a light critical angle is α; a shape of the pyramid-like structure meets the following mathematical conditions:

$\alpha = \sin^{-1}(1/n)$;
$d' < P < d"$;
$d' = 2 \cdot OD \cdot (\tan(90-\alpha-\theta'/2) + \tan(\theta'/2-2\alpha))$;
$d" = 2 \cdot OD \cdot (\tan(90-\alpha-\theta"/2) + \tan(\theta"/2-2\alpha))$.

2. The diffusion plate of claim 1, wherein, the first inclination angle refers to the included angle between the first side-edge and the bottom surface; the second inclination angle refers to the included angle between the second side-edge and the bottom surface; both the first inclination angle and the second inclination angle are less than 90°.

3. The diffusion plate of claim 1 wherein, n=1.59; 5 mm≤P≤10 mm; 0 mm<OD≤5 mm; a length W of the bottom edge of the bottom surface of the pyramid-like structure is 0.05 mm≤W≤1 mm; a height H' of the first convex portion in the Z-axis direction is 0.1 mm≤H'≤2 mm; a height H" of the second convex portion in the Z-axis direction is 0.05 mm≤H"≤1 mm.

4. The diffusion plate of claim 3, wherein, the angle of one of the first vertex angle θ' and the second vertex angle θ" is between 40° and 60°, and the other one is between 60° and 90°.

5. The diffusion plate of claim 4, wherein, the angle of the first vertex angle is smaller than the angle of the second vertex angle, that is, 0<0", P=10 mm; OD=3 mm.

6. The diffusion plate of claim 1, wherein, the light-emitting elements are Mini LEDs; a material of the diffusion plate includes at least one of the following: polycarbonate (PC), polystyrene (PS), polymethyl methacrylate (PMMA, commonly known as acrylic), polypropylene (PP), or a Copolymer of any aforementioned material.

7. The diffusion plate of claim 6, wherein, the diffusion plate is a multi-layer structure composed of at least two layers of different materials by coextrusion process; a plurality of diffusion particles are contained in the diffusion plate; a material of the diffusion particles includes one of the following: silicon dioxide ($SiO_2$), titanium dioxide ($TiO_2$), polymethylmethacrylate (PMMA), polystyrene (PS), polycarbonate (PC), polypropylene (PP), or copolymer of the aforementioned materials; a particle diameter of the diffusion particles ranges from 0.5 to 10 μm, and a weight percentage of concentration of the diffusion particles ranges from 1 to 10% wt.

8. The diffusion plate of claim 7, wherein, the diffusion plate has a three-layer structure which includes: an engineering plastic layer containing polycarbonate (PC), an upper acrylic (Polymethyl Methacrylate; PMMA) layer located above the engineering plastic layer, and a lower acrylic layer located below the engineering plastic layer; a refractive index difference range between these three layers of the diffusion plate is between 0.01 and 0.1; wherein, a thickness of the engineering plastic layer accounts for 60%-99.99% of total thickness of the diffusion plate, and thicknesses of the upper and lower acrylic layers on the upper and lower sides of the engineering plastic layer account for 0.01%~40% of the total thickness of the diffusion plate.

9. The diffusion plate of claim 8, wherein, the lower surface of the plate body of the diffusion plate is a light-input surface; the lower acrylic layer includes at least one high reflectance material; the high reflectance material has a reflection wavelength range of 400-510 nm, an average reflectance higher than 70%, and contains at least one of the following inorganic substances: silicon dioxide ($SiO_2$), titanium dioxide ($TiO_2$), calcium carbonate, magnesium carbonate, calcium sulfate, and magnesium sulfate.

10. A backlight module having a diffusion plate, comprising:

a substrate, a circuit layout being furnished on the substrate;

a plurality of light-emitting elements, arranged in an array on the substrate and coupling to the circuit layout;

a diffusion plate, located above the substrate; said diffusion plate comprising a plate body and a plurality of pyramid-like structures; said plate body having an upper surface and a lower surface; said pyramid-like structures being arranged in an array on the upper surface of the plate body;

wherein, each said pyramid-like structure comprises:

a bottom surface, the bottom surface is rectangular and has four vertices and four bottom edges;

a first convex portion, said first convex portion protrudes upward from the bottom surface by a first height; the first convex portion includes four first side-edges extending obliquely upward from the four vertices of the bottom surface, respectively; the four first side-edges of the first convex portion are not only equal in length but also extend upward at a same first inclination angle; wherein an angle between two opposite said first side-edges is a first vertex angle;

a second convex portion, protrudes upward from a top of the first convex portion to a second height; the second convex portion includes four second side-edges extending obliquely upward from top-ends of the four first side-edges of the first convex portion; the four second side-edges of the second convex portion are not only equal in length but also extend upward at a same second inclination angle; wherein an angle between two opposite said second side-edges is a second vertex angle;

wherein, the first vertex angle is not equal to the second vertex angle, and therefore, the pyramid-like structure has multiple vertex angles;

wherein, the first inclination angle refers to the included angle between the first side-edge and the bottom surface; the second inclination angle refers to the included angle between the second side-edge and the bottom surface; both the first inclination angle and the second inclination angle are less than 90°;

wherein, the light-emitting elements are arranged on the substrate in a rectangular array along an X-axis direction and a Y-axis direction perpendicular to each other; the light-emitting elements at least comprises a first light-emitting element, a second light-emitting element, a third light-emitting element, and a fourth light-emitting element adjacently arranged at four apex positions of a rectangular block; a line segment defined by the first light-emitting element and the second light-emitting element as its two end points is parallel to the X-axis direction, in addition, another line segment defined by the first light-emitting element and the fourth light-emitting element as its two end points is parallel to the Y-axis; the included angle between the line segment formed by the first light-emitting element and the third light-emitting element and the X-axis direction is approximately 45° and is a diagonal line of the rectangular block; the first light-emitting element is substantially located below a center point of the bottom surface of one of the pyramid-like structures, and emits light substantially upward toward a Z-axis direction; the Z-axis direction, the X-axis direction and the Y-axis direction are all perpendicular to each other;

the first convex portion of the pyramid-like structure has four first side-faces formed by said four first side-edges; each said first side-face is able to refract the light emitted by the first light-emitting element and thereby generate a first light-splitting point corresponding to the light-emitting element;

the second convex portion of the pyramid-like structure has four second side-faces formed by said four second side-edges; each said second side-face is able to refract the light emitted by the first light-emitting element and thereby generate a second light-splitting point corresponding to the light-emitting element;

the distance between the first light-emitting element and the third light-emitting element is P; the distance between the first light-emitting element and the bottom surface of the pyramid-like structure is OD; the distance between the first light-emitting element and the first light splitting point is d'/2; the distance between the first light-emitting element and the second light splitting point is d"/2; the first vertex angle is θ'; the second apex angle is θ"; a refractive index of material of the diffusion plate is n, and a light critical angle is α; a shape of the pyramid-like structure meets the following mathematical conditions:

α=sin⁻¹(1/n);
d'<P<d";
d'=2*OD*(tan(90−α−θ'/2)+tan(θ'/2−2α)
d"=2*OD*(tan(90−α−θ")+tan(θ"/2−2α).

11. The backlight module of claim 10, wherein, n=1.59; 5 mm≤P≤10 mm; 0 mm<OD≤5 mm; a length W of the bottom edge of the bottom surface of the pyramid-like structure is 0.05 mm≤W≤1 mm; a height H' of the first convex portion in the Z-axis direction is 0.1 mm≤H'≤2 mm; a height H" of the second convex portion in the Z-axis direction is 0.05 mm≤H"≤1 mm.

12. The backlight module of claim 11, wherein, the angle of one of the first vertex angle θ' and the second vertex angle θ" is between 40° and 60°, and the other one is between 60° and 90°.

13. The backlight module of claim 12, wherein, the angle of the first vertex angle is smaller than the angle of the second vertex angle, that is, θ'<θ"; P=10 mm; OD=3 mm.

14. The backlight module of claim 10, wherein, the light-emitting elements are Mini LEDs; a material of the diffusion plate includes at least one of the following: polycarbonate (PC), polystyrene (PS), polymethyl methacrylate (PMMA, commonly known as acrylic), polypropylene (PP), or a Copolymer of any aforementioned material.

15. The backlight module of claim 14, wherein, the diffusion plate is a multi-layer structure composed of at least two layers of different materials by coextrusion process; a plurality of diffusion particles are contained in the diffusion plate; a material of the diffusion particles includes one of the following: silicon dioxide (SiO₂), titanium dioxide (TiO₂), polymethylmethacrylate (PMMA), polystyrene (PS), polycarbonate (PC), polypropylene (PP), or copolymer of the aforementioned materials; a particle diameter of the diffusion particles ranges from 0.5 to 10 μm, and a weight percentage of concentration of the diffusion particles ranges from 1 to 10% wt.

16. The backlight module of claim 15, wherein, the diffusion plate has a three-layer structure which includes: an engineering plastic layer containing polycarbonate (PC), an upper acrylic (Polymethyl Methacrylate; PMMA) layer located above the engineering plastic layer, and a lower acrylic layer located below the engineering plastic layer; a refractive index difference range between these three layers of the diffusion plate is between 0.01 and 0.1; wherein, a thickness of the engineering plastic layer accounts for 60%-99.99% of total thickness of the diffusion plate, and thicknesses of the upper and lower acrylic layers on the upper and lower sides of the engineering plastic layer account for 0.01%~40% of the total thickness of the diffusion plate.

17. The backlight module of claim 10, further comprising:
a dichroic filter film, located above the diffusion plate, which can transmit or reflect the light emitted by the light-emitting element according to different wavelengths, capable of reflecting red and green light, and providing blue light;
a color conversion layer, located above the dichroic filter film, the color conversion layer being an optical film containing Quantum Dots (QD) material or fluorescent materials that can convert part of blue wavelength light energy into red and green wavelengths in order to output white light as required;

at least one prism sheet, located above the color conversion layer, which can concentrate scattered light to improve the brightness of the central viewing angle; and a dual brightness enhancement film (DBEF), located above the at least one prism sheet, which can further increase the brightness of the light as well as the range of viewing angles;

wherein, a reflective layer is provided on a top surface of the substrate.

* * * * *